United States Patent [19]
Kato et al.

[11] Patent Number: 5,335,026
[45] Date of Patent: Aug. 2, 1994

[54] EYEGLASS LENS

[75] Inventors: Kazutoshi Kato; Toshiharu Katada; Osamu Yokoyama, all of Suwa, Japan

[73] Assignee: Seiko Epson Corporation, Tokyo, Japan

[21] Appl. No.: 67,878

[22] Filed: May 27, 1993

Related U.S. Application Data

[63] Continuation of Ser. No. 714,292, Jun. 12, 1991, Pat. No. 5,270,746.

Foreign Application Priority Data

Jun. 13, 1990 [JP] Japan ................. 2-154371
Aug. 22, 1990 [JP] Japan ................. 2-220592
Nov. 28, 1990 [JP] Japan ................. 2-326440

[51] Int. Cl.⁵ .................. G02C 7/02; G02C 7/06
[52] U.S. Cl. .................. 351/159; 351/169; 351/176
[58] Field of Search ............ 351/159, 176, 168, 169

[56] References Cited

U.S. PATENT DOCUMENTS 4,613,217  9/1986  Fuerter et al. .................. 351/176

Primary Examiner—Scott J. Sugarman
Attorney, Agent, or Firm—Stroock & Stroock & Lavan

[57] ABSTRACT

A lens for eyeglasses which corrects an astigmatism includes a first refracting surface and a second refracting surface. Each refracting surface has an optical center and a periphery. At least one of the refracting surfaces is divided into a first portion and a second portion in which the first portion has a variation in curvature of the lens which is greater than the variation of curvature of the second portion.

7 Claims, 30 Drawing Sheets

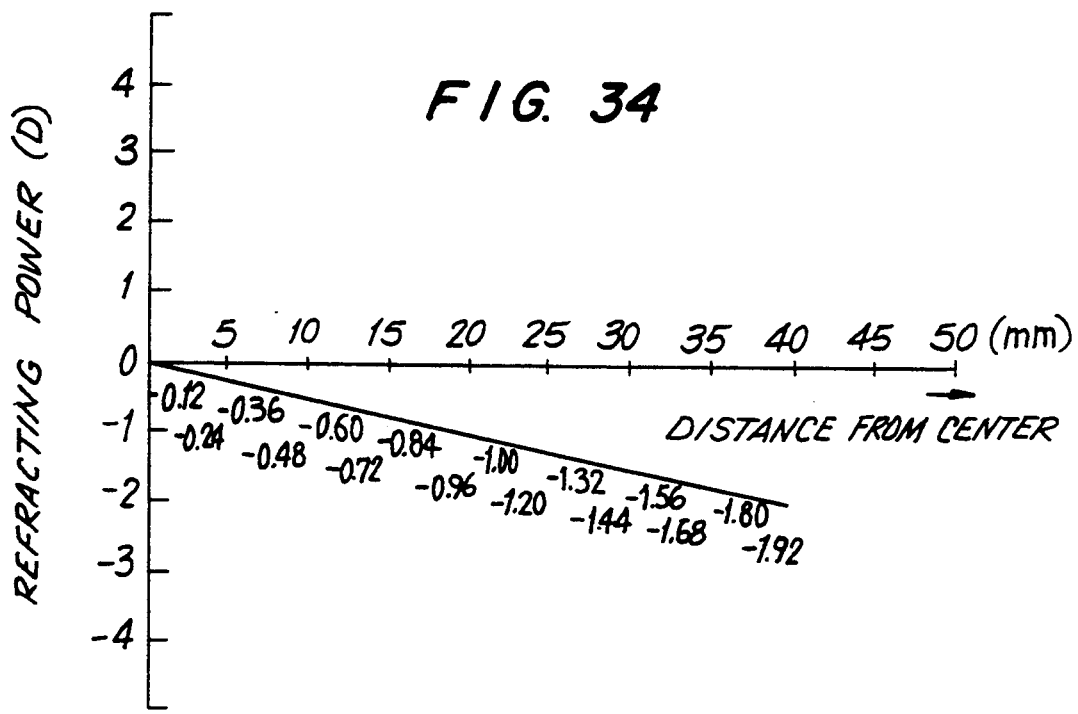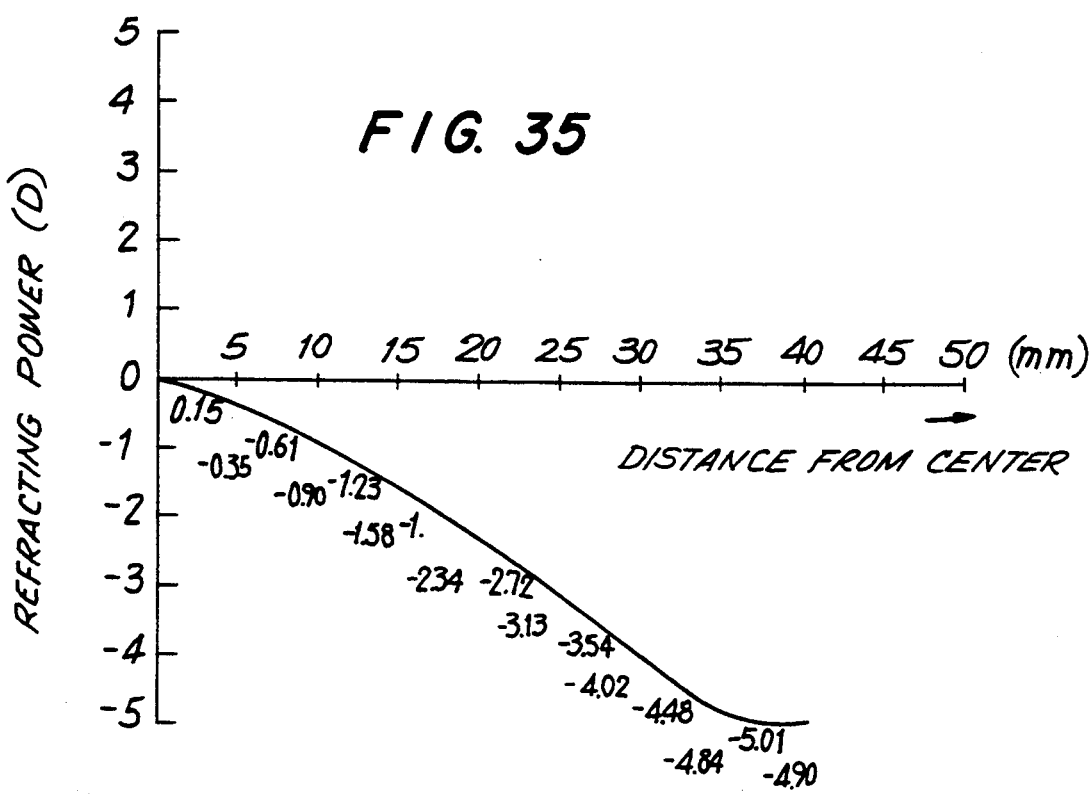

0.30 M ———
1.00 M − − − −
1000.00 M − − −

0.30 M ———
1.00 M — — —
1000.00 M – – –

0.30 M ———
1.00 M - - - -
1000.00 M — — —

0.30 M ————
1.00 M — — —
1000.00 M — · —

EYEGLASS LENS

This is a continuation of U.S. patent application Ser. No. 07/714,292 filed on Jun. 12, 1991 now U.S. Pat. No. 5,270,746.

BACKGROUND OF THE INVENTION

The present invention is directed to a corrective eyeglass lens, and, in particular, to an eyeglass lens which corrects astigmatism, hyperopia, myopia and the like.

Corrective eyeglass lenses known in the art have a structure such as eyeglass lens 10 shown in FIG. 1. Eyeglass lens 10 has a front refracting surface 12 which is spherical and a back refracting surface 14 which may be formed as a spherical or a non-spherical surface known as the toric surface which is adapted to the prescription of the eyeglass wearer. Distortions arise in the visual image passing through lens 10 in the form of astigmatism. The astigmatism of lens 10 is illustrated in FIG. 2 and can be reduced by selecting a value of the radius of curvature for the spherical surface of front refracting surface 12. However, in a conventional lens, the radius of curvature of front refracting surface 12 is most likely relatively small, resulting in a forward protrusion which is rather conspicuous and detracts from the aesthetic value of the eyeglass lens. Additionally, such a lens construction does not lend itself to reduction in eyeglass thickness or weight.

Reference is now made to FIGS. 3 and 4 in which an eyeglass lens 20, constructed in accordance with the prior art, includes a front refracting surface 22 formed as a non-spherical surface, symmetric with respect to the rotation axis R through the center 0 of lens 20. The forward protrusion of lens 20 has been reduced while retaining the distortion at a lowest possible level, achieving a substantial improvement in terms of thickness and weight as well as aesthetics. The distortions are mitigated by forming the forward refracting surface 22 as a non-spherical surface. Lens 20 has been satisfactory. However, if the distortions are mitigated, these distortions are only mitigated with respect to an object positioned at a fixed distance and not over a range of distances.

As can be seen from FIG. 4, there is no decrease in the astigmatism with respect to objects at other distances from the closest vicinity represented by 0.3 meters to a long distance represented by infinity. Lens 20 provides a clear visual field with little astigmatism with respect to an object at a position 1 meter away. However, with respect to the other distances, there is not a complete elimination of the astigmatism.

Accordingly, it is desired to provide an eyeglass lens which overcomes the shortcomings of the prior art.

SUMMARY OF THE INVENTION

Generally speaking, in accordance with the invention, an eyeglass lens includes a front refractive surface and a rear refractive surface. The rear refractive surface has a radius of curvature which varies from the optical center of the lens to the outer periphery of the lens.

In one embodiment of the invention, at least one refracting surface has a relatively small negative refracting power in a region extending from the center of the eyeglass lens to the periphery of the eyeglass lens and a refracting surface having a relatively large refracting power in a second region extending from the center of the eyeglass to the periphery of the eyeglass. A compensating surface is adapted to compensate for the optical characteristics due to the negative refracting power.

Accordingly, it is an object of the invention to provide an improved eyeglass lens.

Yet another object of the invention is to provide a thin lightweight lens for eyeglasses which mitigates astigmatism at substantially all distances extending from the closest vicinity to a great distance.

Still another object of the invention is to provide an eyeglass lens which compensates for astigmatism when viewing close objects and a separate portion of the eyeglass for adjusting for astigmatism of objects viewed at a far distance.

Still other objects and advantages of the invention will in part be obvious and will in part be apparent from the specification and drawings.

The invention accordingly comprises an article of manufacture possessing the features, properties, and the relation of elements which will be exemplified in the constructions hereinafter described, and the scope of the invention will be indicated in the claims.

BRIEF DESCRIPTION OF THE DRAWINGS

For a fuller understanding of the invention, reference is had to the following description, taken in connection with the accompanying drawings, in which:

FIG. 34 is a graph of the refracting power of the front refracting surface of the concave eyeglass lens constructed in accordance with the seventh embodiment of the invention;

FIG. 35 is a graph of the refracting power of the back refracting surface of the concave eyeglass lens constructed in accordance with the seventh embodiment of the invention;

DESCRIPTION OF THE PREFERRED EMBODIMENTS

Figure 1:
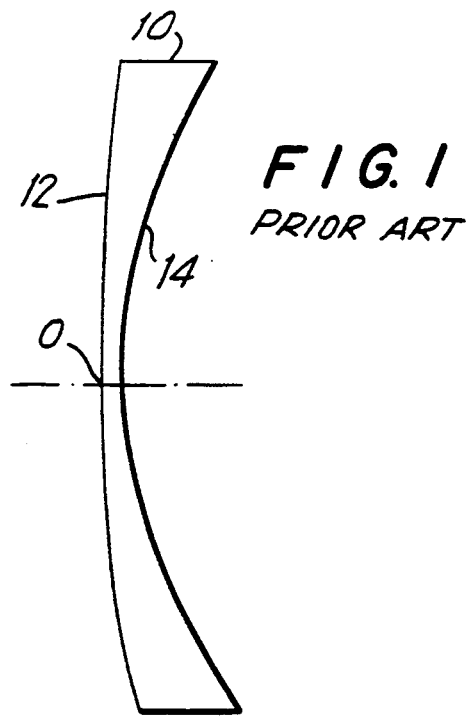
FIG. 1 is a sectional view of a spherical lens constructed in accordance with the prior art.
Figure 2:
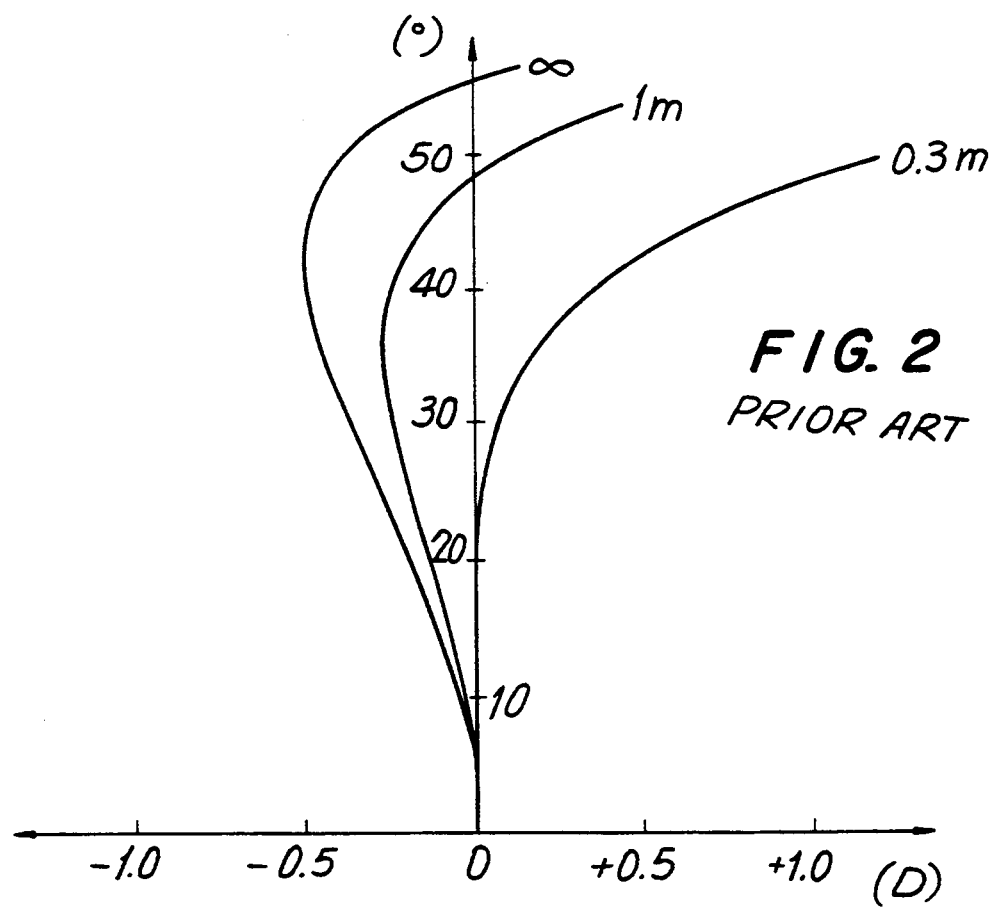
FIG. 2 is a graph showing the astigmatism of the prior art lens of FIG. 1.
Figure 3:
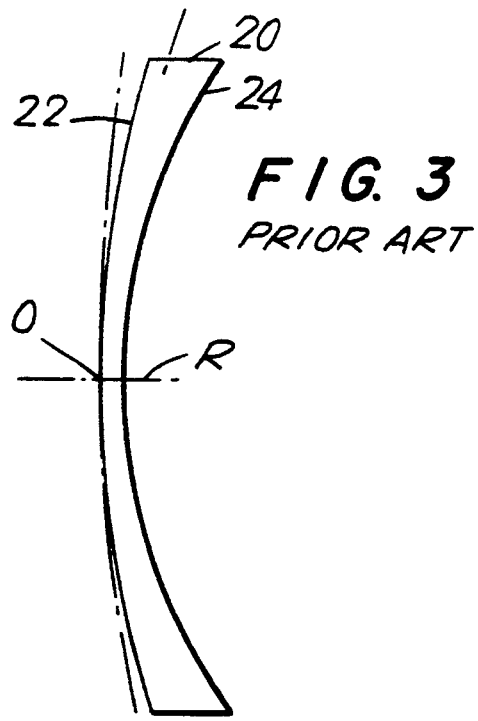
FIG. 3 is a sectional view of non-spherical lens constructed in accordance with the prior art.
Figure 4:
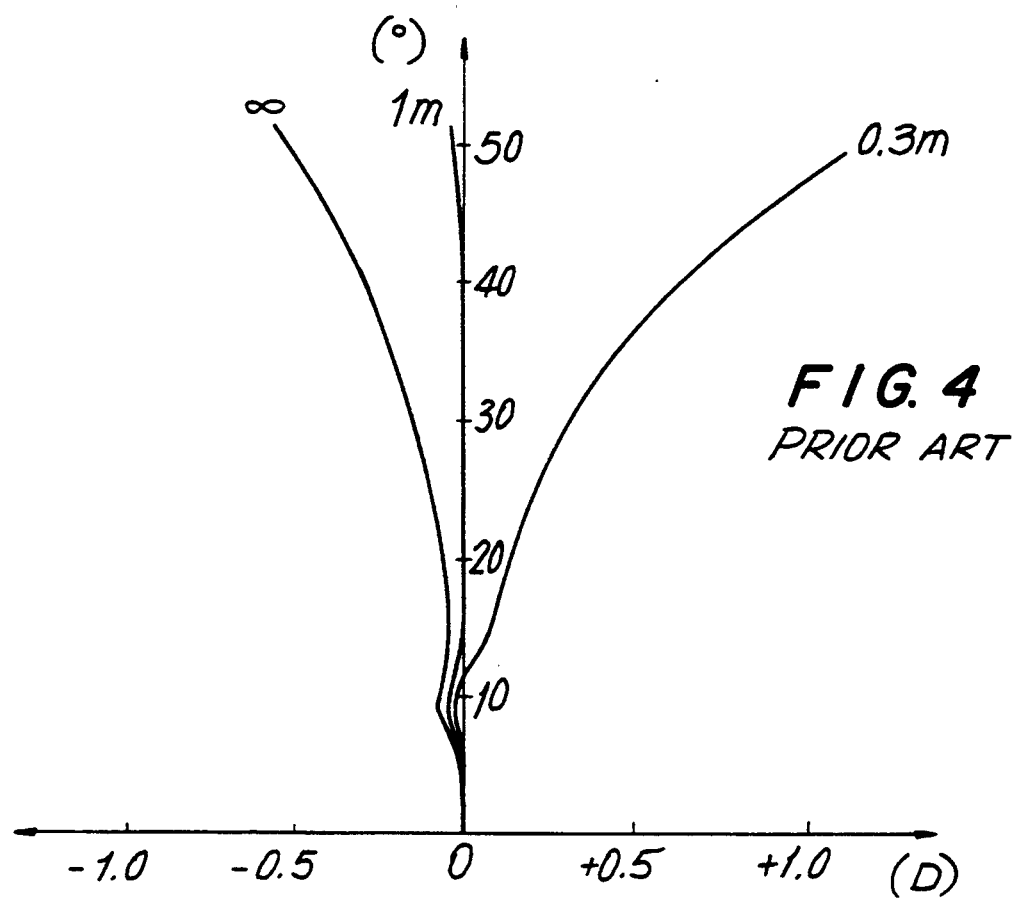
FIG. 4 is a graph showing the astigmatism of the non-spherical lens constructed in accordance with the prior art.
Figure 5:
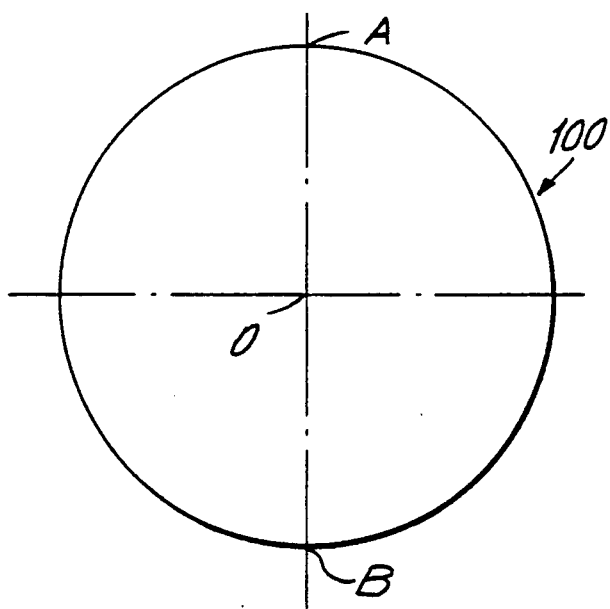
FIG. 5 is a front elevational view of an eyeglass lens constructed in accordance with a first embodiment of the invention.
Figure 6:
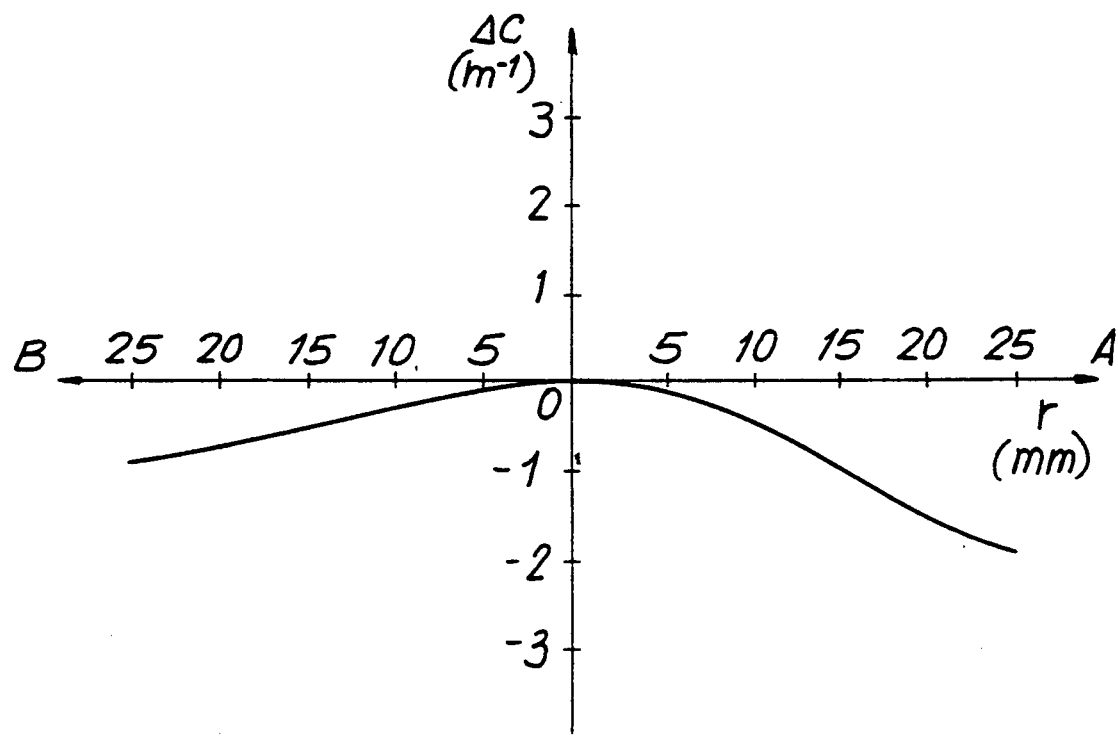
FIG. 6 is a graph representing the variation in curvature of the front refracting surface of the lens of FIG. 5.

Reference is first made to FIGS. 5-8 in which an eyeglass lens, generally indicated as 100, constructed in accordance with a first embodiment of the invention is shown. Eyeglass lens 100 is a +3.00 diopter powered lens. Lens 100 includes an optical center 0 which coincides with the center of the pupil of the wearer when lens 100 is fitted into an eyeglass frame. A first line segment 0A extends from the optical center to a point on the periphery of eyeglass lens 100 in one direction. A second line segment OB extends from the optical center 0 to the periphery in the opposite direction. Line segment OB is the meridian of lens 100. The variation in curvature from the optical center O to the outer periphery is a maximum along line segment OA and a minimum along line segment OB. Variations in curvature in other meridians of lens 100 have values somewhere between the variation of curvature in line segment OA and that of line segment OB. The variation of curvature along line segments OA and OB is shown in FIG. 6.

The actual curvature along each of these lines is represented in the following table:

TABLE 1

| Distance from the center (mm) | Curvature in OA (1/m) | Curvature in OB (1/m) |
|---|---|---|
| 0.0 | 8.40 | 8.40 |
| 5.0 | 8.26 | 8.32 |
| 10.0 | 7.88 | 8.10 |
| 15.0 | 7.37 | 7.85 |
| 20.0 | 6.88 | 7.63 |
| 25.0 | 6.46 | 7.51 |

Figure 7:
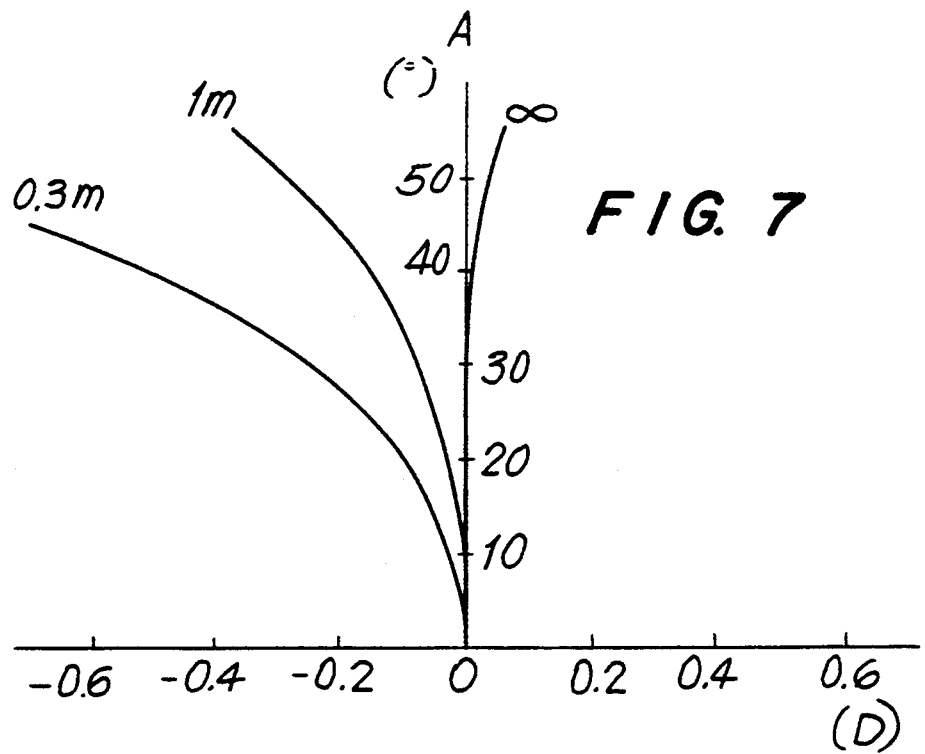
FIG. 7 is a graph of the astigmatism of an object at a far distance viewed through a portion of the lens constructed in accordance with the first embodiment of the prior art.
Figure 8:
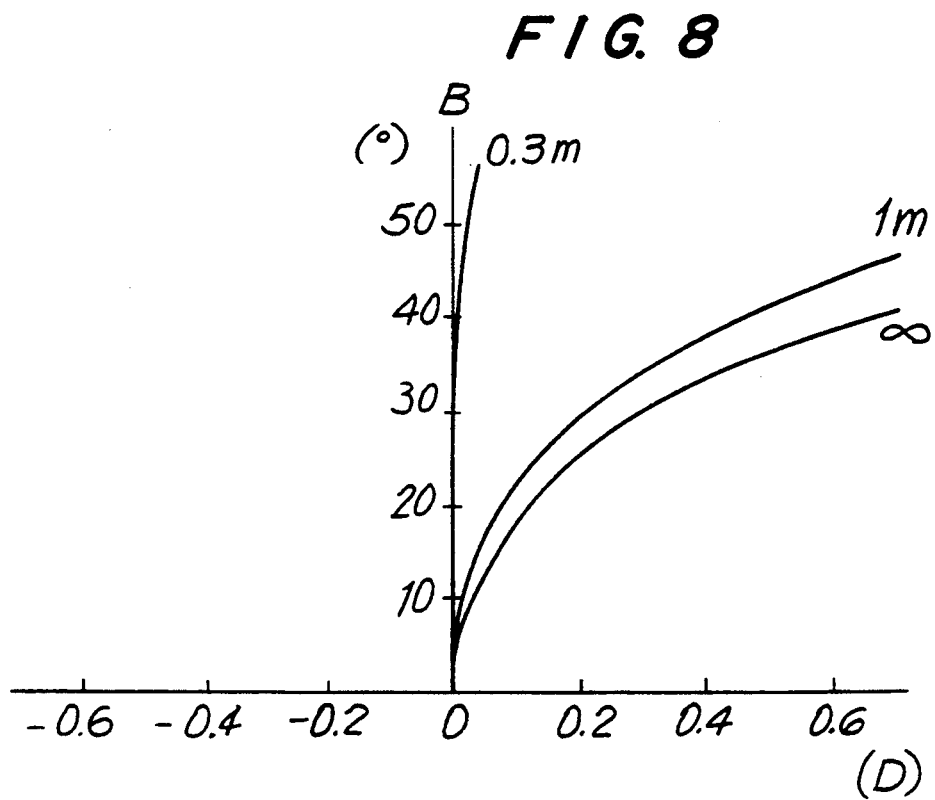
FIG. 8 is a graph of the astigmatism of an object at a close distance viewed through another portion of the lens constructed in accordance with the first embodiment of the prior art.
Figure 9:
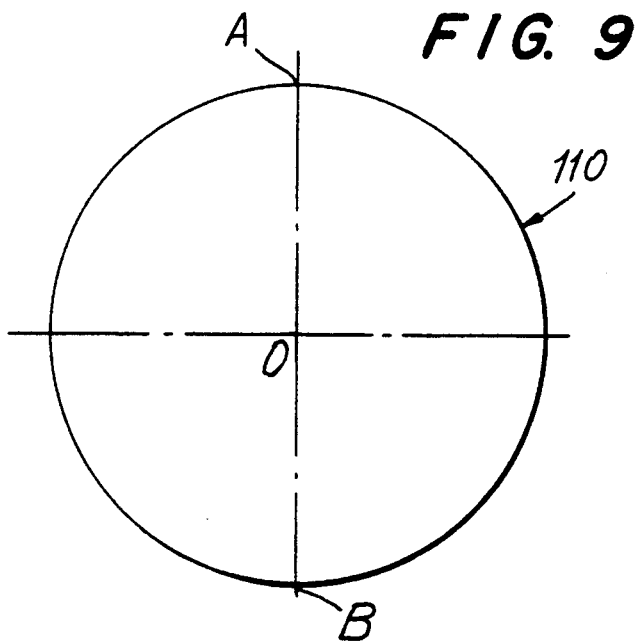
FIG. 9 is a front elevational view of an eyeglass lens constructed in accordance with a second embodiment of the invention.

When an object is viewed at a large distance represented by infinity (∞) through the line segment OA of lens 100, an astigmatism is exhibited as shown in FIG. 7. When an object is viewed at 30 cm through line segment OB, an astigmatism is exhibited as shown in FIG. 8.

Figure 10:
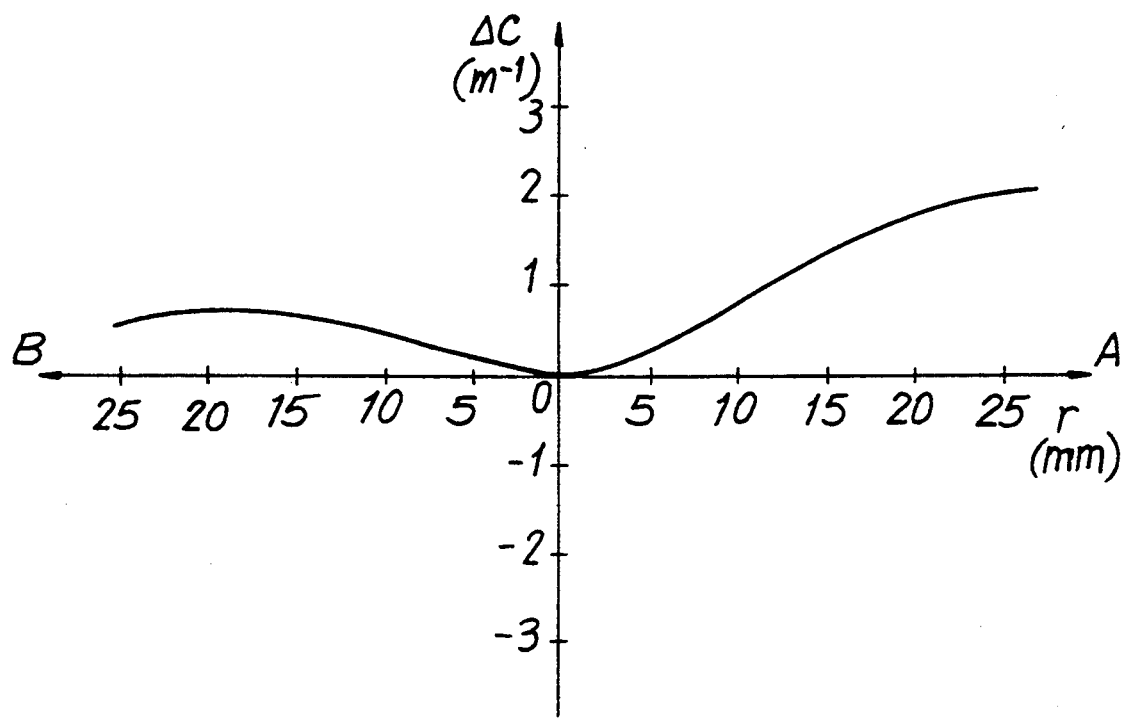
FIG. 10 is a graph of the variation in curvature of the front refracting surface of an eyeglass lens constructed in accordance with a second embodiment of the invention.
Figure 11:
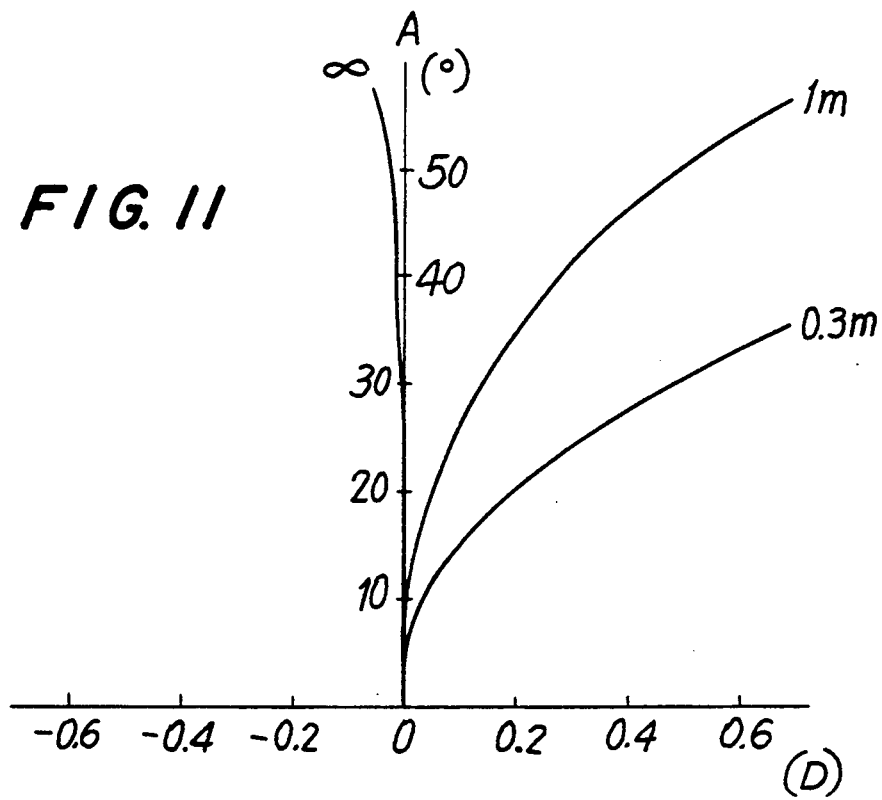
FIG. 11 is a graph representing the astigmatism of an object at a far distance observed through a first portion of the eyeglass lens of the second embodiment.
Figure 12:
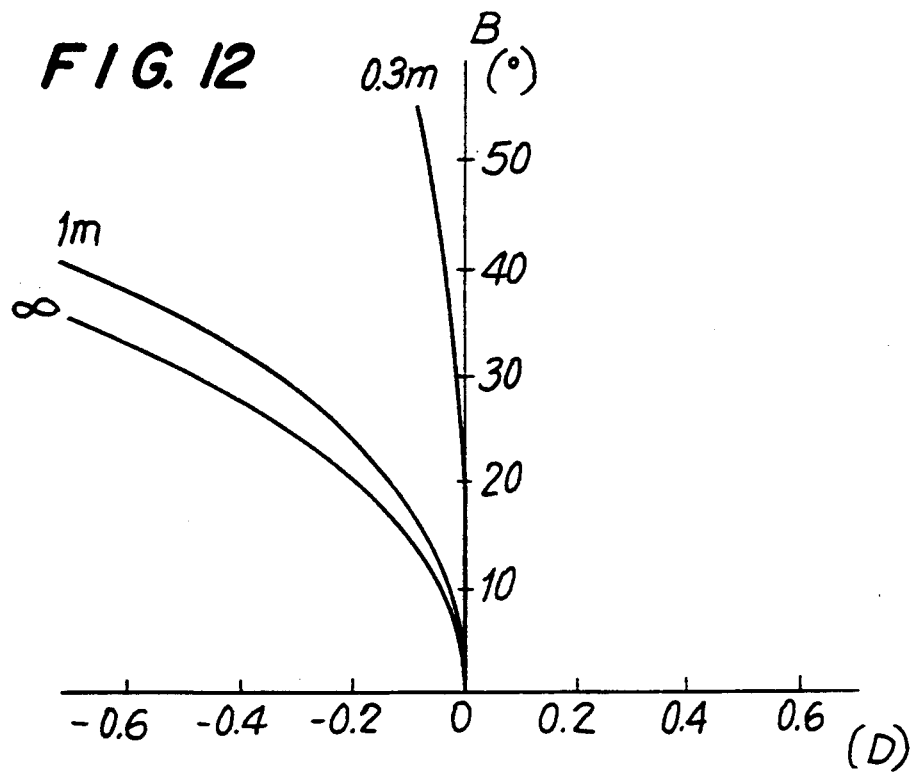
FIG. 12 is a graph showing the astigmatism of an object at a close distance viewed through another portion of the eyeglass lens constructed in accordance with a second embodiment of the invention.

Reference is now made to FIGS. 10-12 in which an eyeglass lens, generally indicated at 110, constructed in accordance with a second embodiment of the invention is provided. Line segments 0A and OB are utilized again to exhibit the same properties in each of the embodiments to be discussed unless otherwise stated. Eyeglass lens 110 exhibits a power of −6.00 diopters. A variation in curvature of the front refracting surface along line segments 0A and OB are illustrated in FIG. 10. It should be noted that the variation in curvature is opposite that for eyeglass lens 100. However, this does not affect the features of the invention, namely: that the variation in curvature along meridian OA is larger than the variation in curvature along meridian OB. The curvature of this embodiment is shown in TABLE 2 below.

TABLE 2

| Distance from the center (mm) | Curvature in OA (1/m) | Curvature in OB (1/m) |
|---|---|---|
| 0.0 | 1.68 | 1.68 |
| 5.0 | 1.92 | 1.79 |
| 10.0 | 2.50 | 2.02 |
| 15.0 | 3.13 | 2.19 |
| 20.0 | 3.58 | 2.20 |
| 25.0 | 3.79 | 2.00 |

The astigmatism which results from an object observed at a great distance represented as infinity through line segment OA of eyeglass lens 110 is shown in FIG. 11. The astigmatism which results from viewing an object at a short distance such as 30 cm through line segment OB is shown in FIG. 12.

Figure 13:
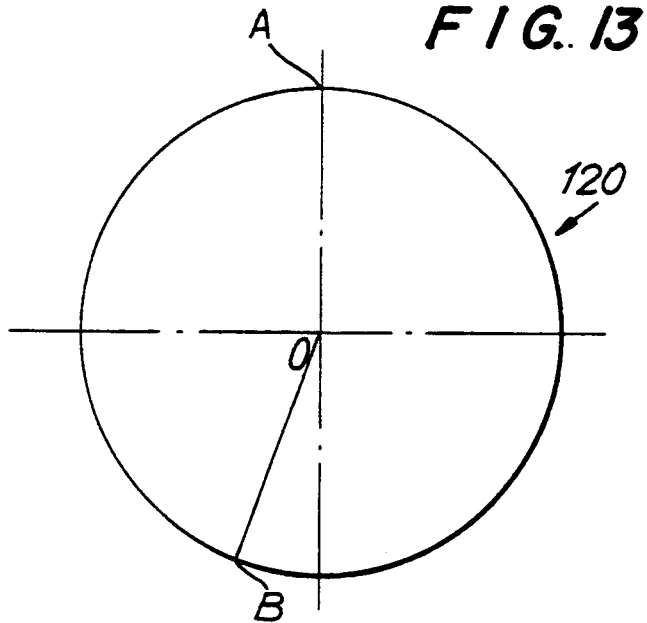
FIG. 13 is a front elevational view of an eyeglass lens constructed in accordance with a third embodiment of the invention.
Figure 14:
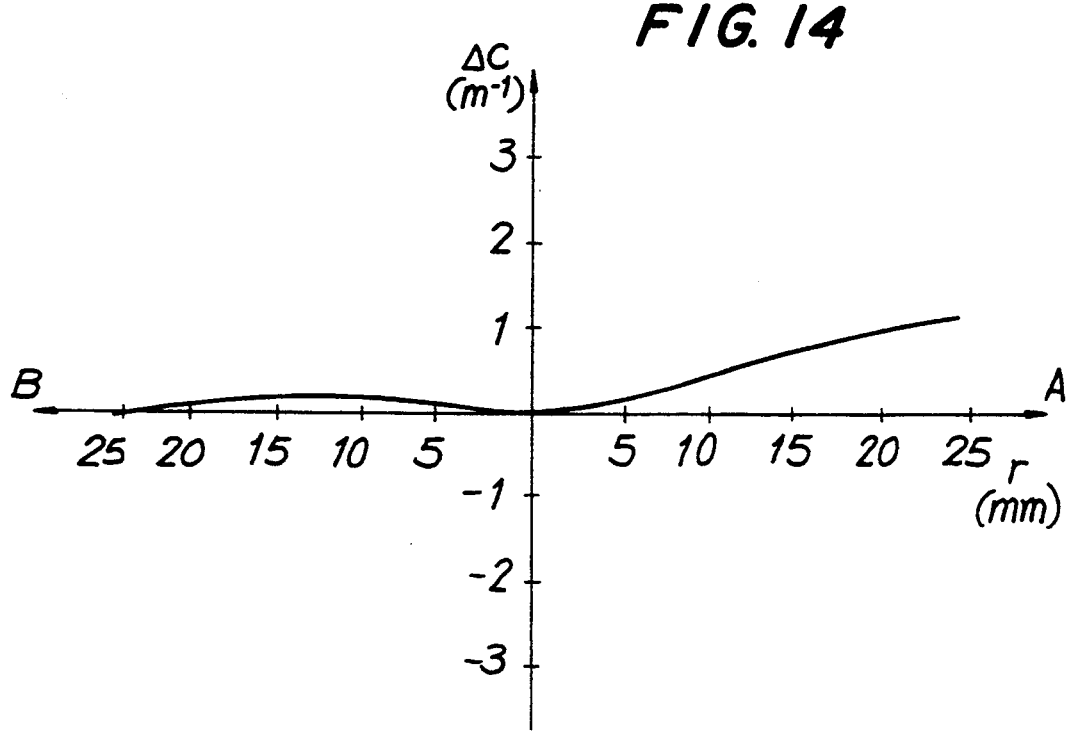
FIG. 14 is a graph showing the variation in curvature across the front refracting surface of an eyeglass lens constructed in accordance with a third embodiment of the invention.

Reference is now made to FIGS. 13 and 14 in which an eyeglass lens, generally indicated as 120, constructed in accordance with a third embodiment of the invention is provided. Eyeglass lens 120 is a −3.00 diopter powered lens. The variation in curvature along the line segment OA and OB of the front refracting surface of lens 120 shown in FIG. 13 is shown in FIG. 14. The actual curvature of the front refracting surface of eyeglass lens 120 along lines OA and OB is shown in TABLE 3 below.

TABLE 3

| Distance from the center (mm) | Curvature in OA (1/m) | Curvature in OB (1/m) |
|---|---|---|
| 0.0 | 5.04 | 5.04 |
| 5.0 | 5.16 | 5.08 |
| 10.0 | 5.44 | 5.14 |
| 15.0 | 5.76 | 5.17 |
| 20.0 | 6.00 | 5.13 |
| 25.0 | 6.12 | 5.03 |

Figure 15:
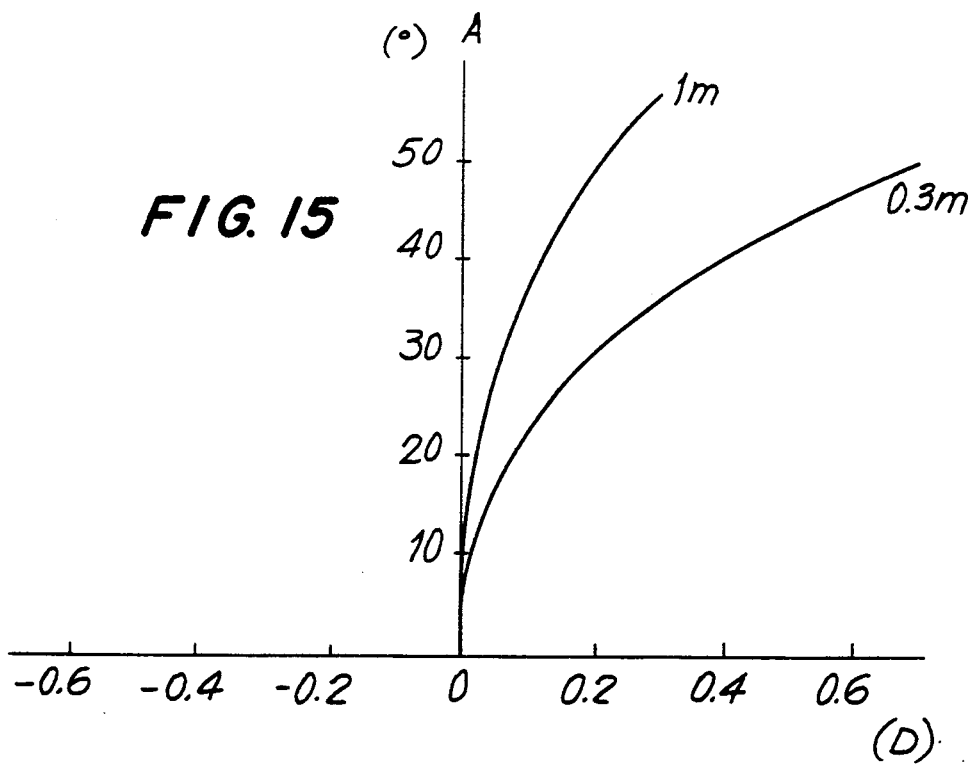
FIG. 15 is a graph showing the astigmatism of an object at a far distance viewed through a first portion of the eyeglass lens constructed in accordance with the third embodiment of the invention.
Figure 16:
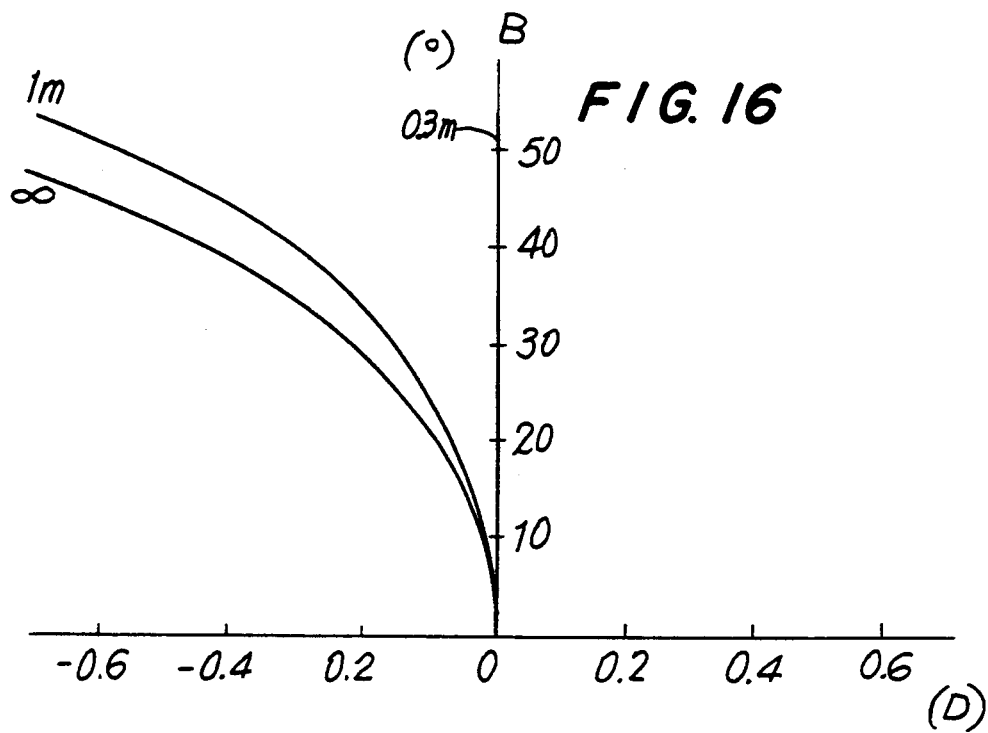
FIG. 16 is a graph showing the astigmatism of an object at a close distance viewed through a second portion of the eyeglasses lens constructed in accordance with the third embodiment of the invention.
Figure 17:
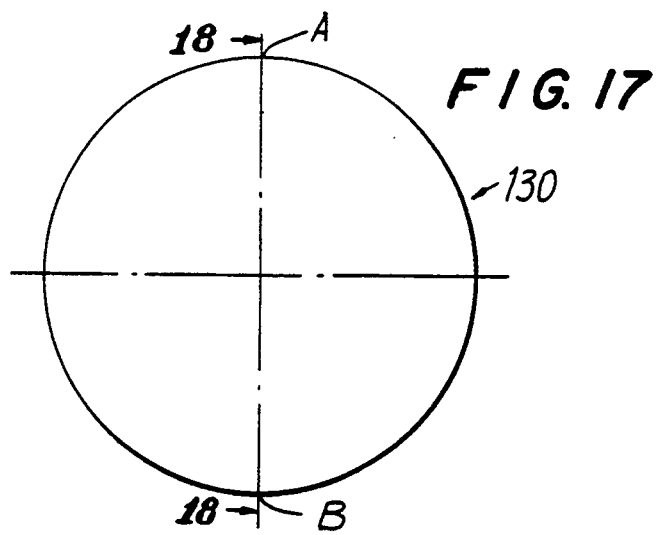
FIG. 17 is a front elevational view of an eyeglass lens constructed in accordance with a fourth embodiment of the invention.
Figure 18:
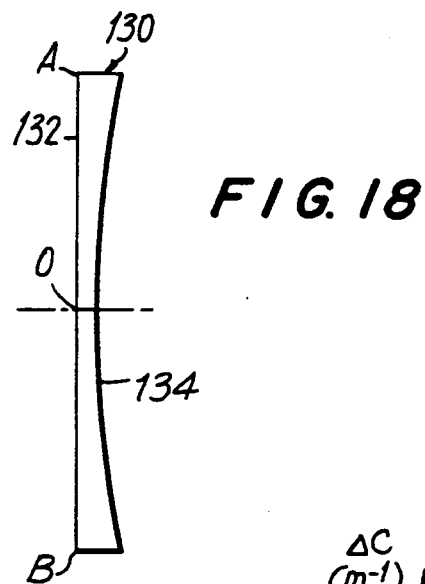
FIG. 18 is a sectional view of the eyeglass lens taken along lines 18—18 of FIG. 15.
Figure 19:
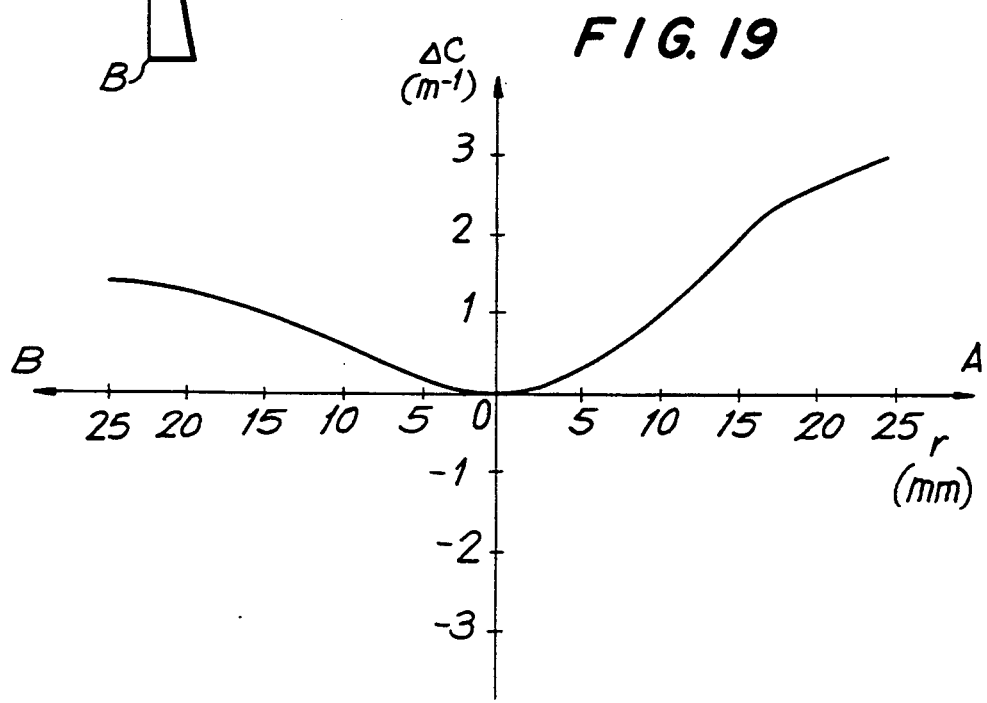
FIG. 19 is a graph of the variation in curvature along the front refractive surface of the eyeglass lens constructed in accordance with the fourth embodiment of the invention.

The astigmatism exhibited when an object at a great distance represented as infinity is observed through line segment OA is shown in FIG. 15. FIG. 16, on the other hand, shows the astigmatism exhibited when an object is viewed at a distance of 30 cm through line segment OB.

Reference is now made to FIGS. 17-21 in which an eyeglass lens, generally indicated as 130, shown in both front elevational view and sectional view, constructed in accordance with a fourth embodiment of the invention is provided. Eyeglass lens 130 is a −6.00 diopter powered lens having a concave front refracting surface 132 and a rear concave refracting surface 34. The variation in curvature along line segments OA and OB of front refracting surface 132 is graphically represented in FIG. 19. The actual curvature along front refracting surface 132 is provided in TABLE 4 below.

TABLE 4

| Distance from the center (mm) | Curvature in OA (1/m) | Curvature in OB (1/m) |
|---|---|---|
| 0.0 | −0.83 | −0.83 |
| 5.0 | −0.52 | −0.64 |
| 10.0 | 0.20 | −0.24 |
| 15.0 | 1.07 | 0.17 |
| 20.0 | 1.76 | 0.47 |
| 25.0 | 2.17 | 0.57 |

Figure 20:
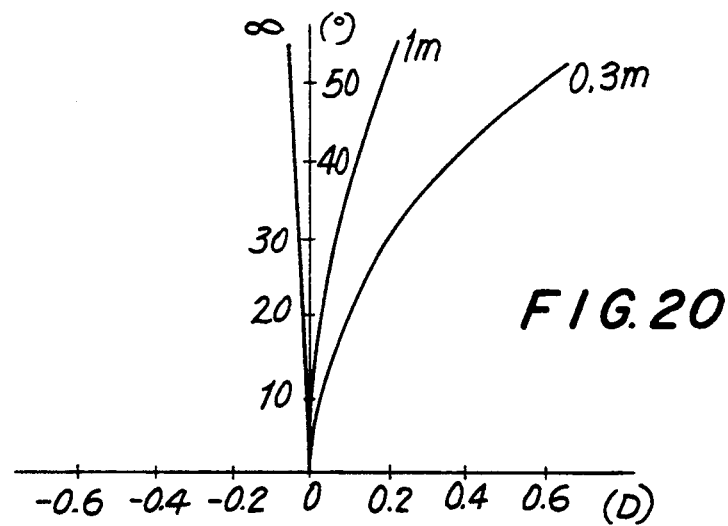
FIG. 20 is a graph of the astigmatism of an object at a far distance viewed through a portion of the eyeglass lens constructed in accordance with the fourth embodiment of the invention.
Figure 21:
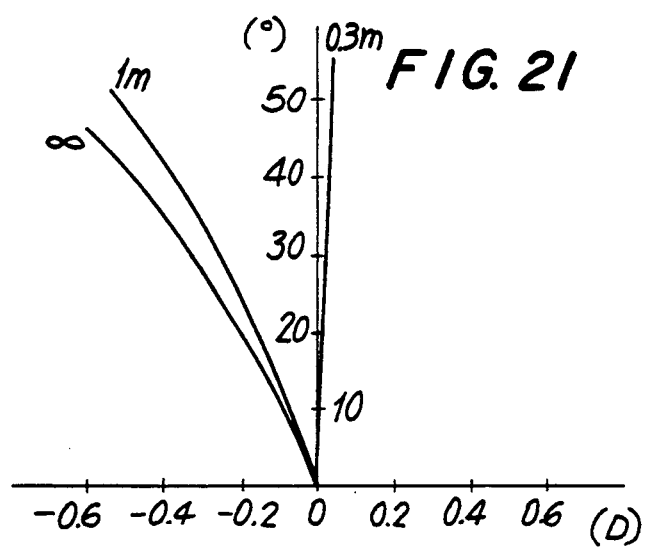
FIG. 21 is a graph of the astigmatism of a close object observed through another portion of the eyeglass lens constructed in accordance with the fourth embodiment of the invention.
Figure 22:
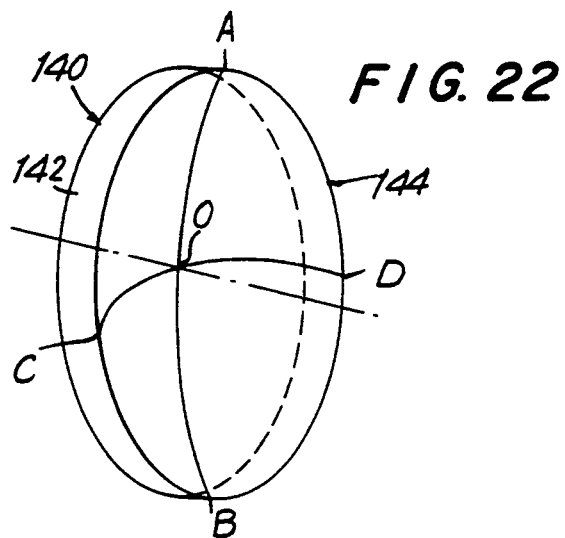
FIG. 22 is a perspective view of a non-spherical eyeglass lens constructed in accordance with a fifth embodiment of the invention.

The astigmatism exhibited when an object viewed at a great distance, represented as infinity, is observed through line segment OA as shown in FIG. 20. The astigmatism exhibited by eyeglass lens 130 when viewing an object at a distance of about 30 cm through line segment OB is shown in FIG. 21.

Reference is now made to FIGS. 22–26 in which an eyeglasses lens, generally indicated as 140, constructed in accordance with a fifth embodiment of the invention is provided. Eyeglass lens 140 is a non-spherical lens having a degree of sphericalness S of +2.00 D. The eyeglass lens exhibits a degree of astigmatism C of +1.00 D. The diameter of the eyeglass lens is 75 mm and the thickness of the eyeglass lens 140 at a central section is 4.0 mm. Eyeglass lens 140 is formed of a material having a refractive index n=1.5. A front refractive surface 142 of eyeglass lens 140 is a spherical surface having a surface refracting power of 5.0 D. The radius of curvature is 100 mm. A rear refracting surface 144 of eyeglass lens 140 is a spherical surface having a radius of curvature at the optical center O of 241.83 mm across the meridian AOB and 163.00 mm along the meridian COD.

Figure 23:
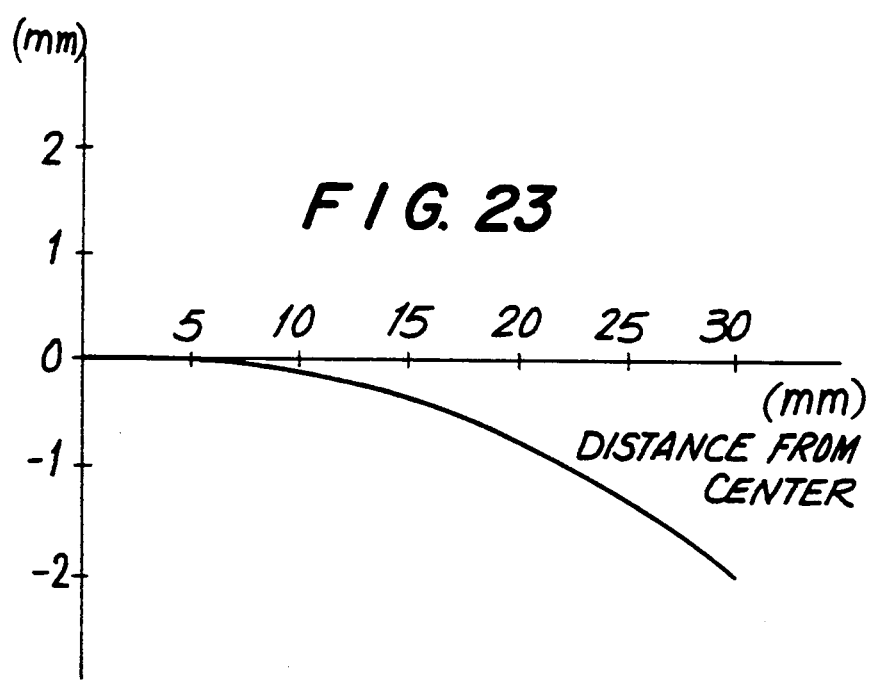
FIG. 23 is a graph of the variation in the radius of curvature of a portion of the eyeglass lens of FIG. 22.
Figure 24:
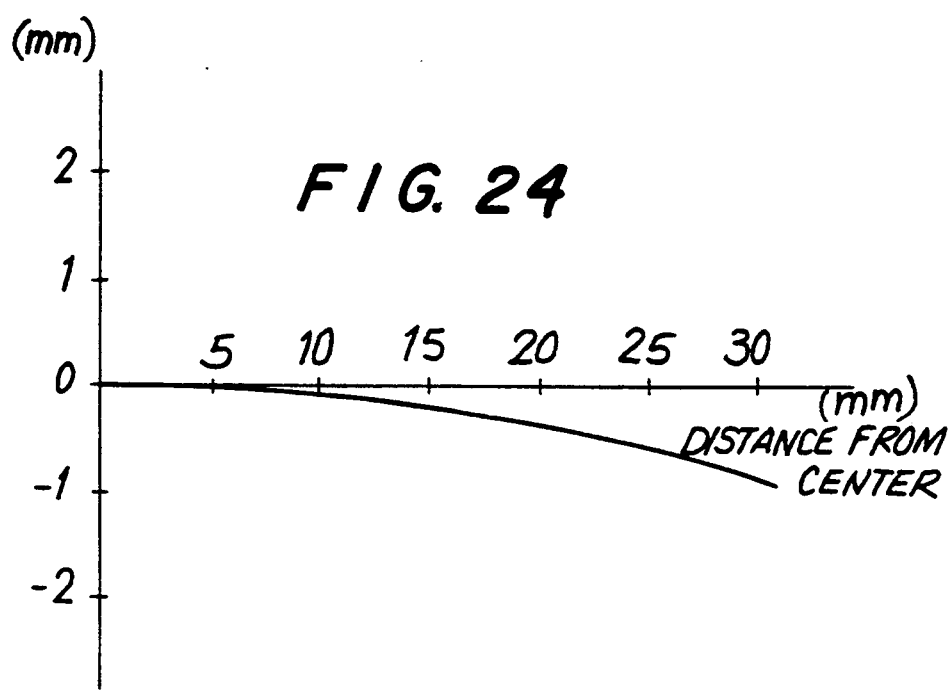
FIG. 24 is a graph of the variation in the radius of curvature along another portion of the eyeglass lens constructed in accordance with the fifth embodiment of the invention.
Figure 25:
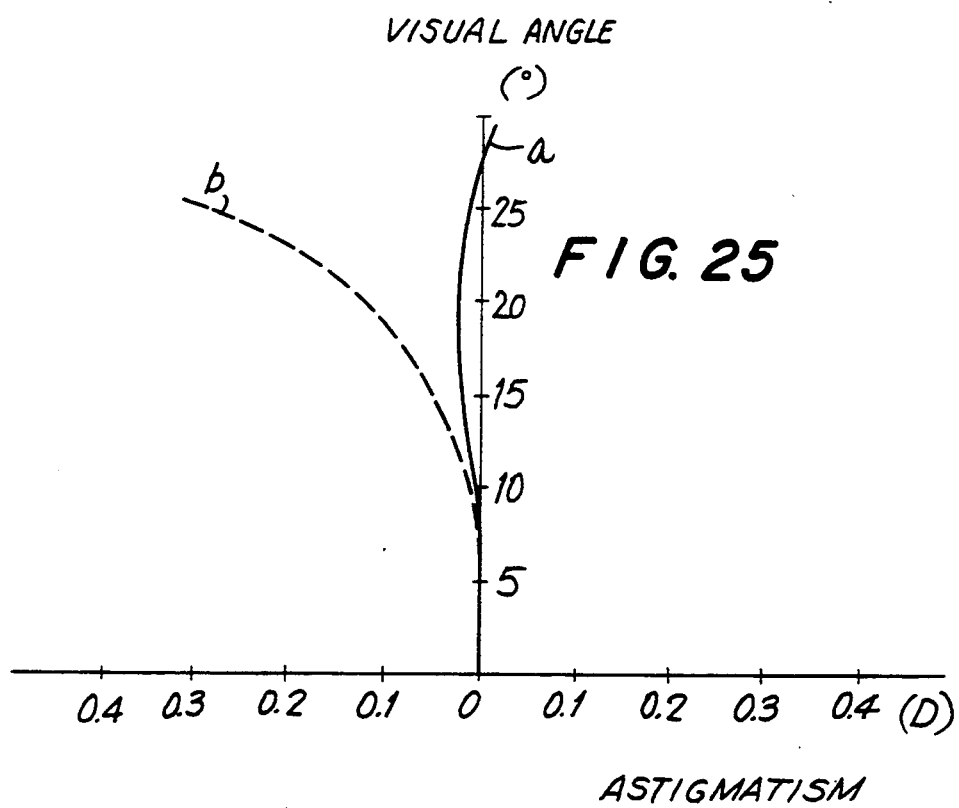
FIG. 25 is a graph of the astigmatism for a portion of the eyeglass lens constructed in accordance with the fifth embodiment of the invention.
Figure 26:
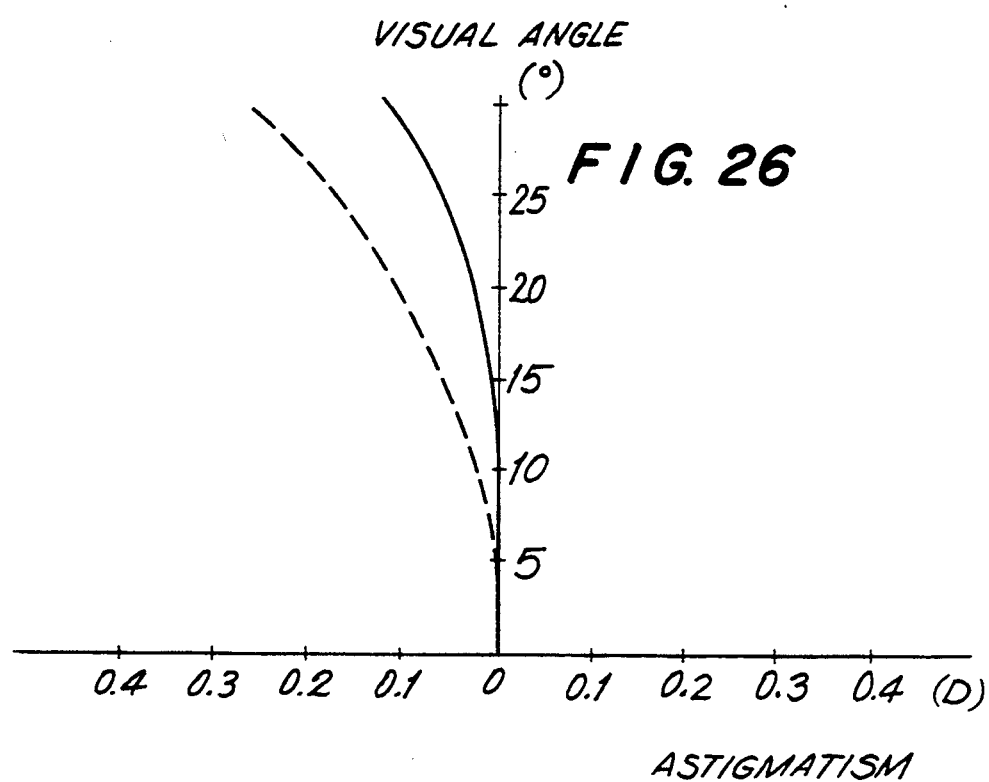
FIG. 26 is a graph of the astigmatism of another portion of the eyeglasses lens constructed in accordance with the fifth embodiment of the invention.

The radii of curvature along meridian AOB and COD varies from optical center O to the outer periphery of the lens. The variation in radius of curvature along line segment OA is shown in FIG. 23. The variation in the radius of curvature along the line segment OB is shown in FIG. 24. The astigmatism exhibited by the lines when looking at an object through line segment OA of eyeglass lens 140 is shown in FIG. 25 as line a. Broken line b represents the astigmatism in a conventional toric surface corrective lens having the same prescription. Similarly, the astigmatism exhibited by eyeglass lens 140 when viewing an object through line segment 0C is represented as line a in FIG. 26 while broken line b represents the astigmatism exhibited in a conventional toric surface corrective lens for an eyeglass lens constructed in accordance with the same specifications.

Figure 27:
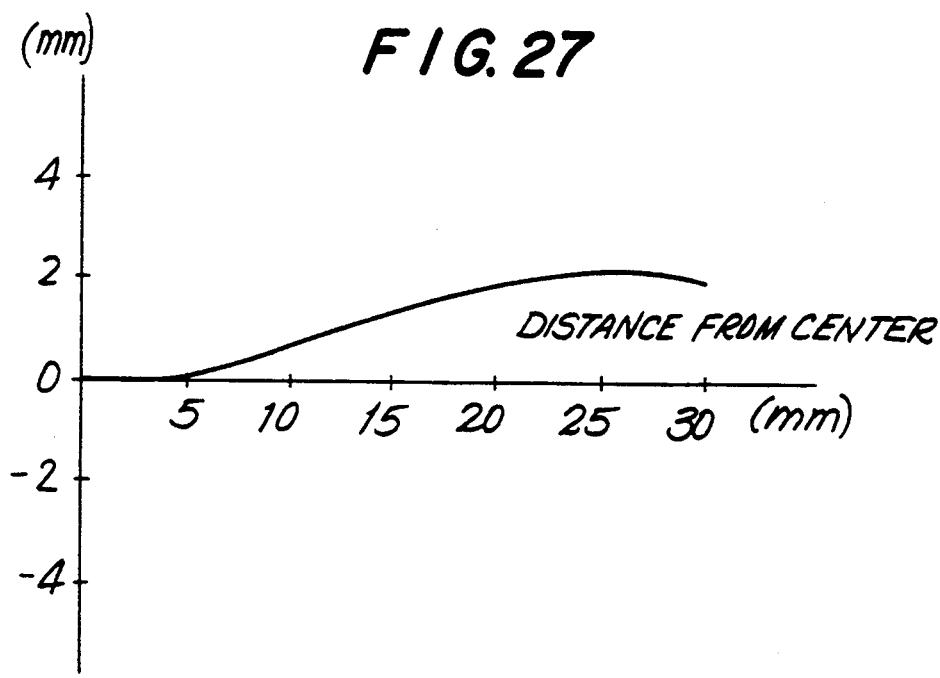
FIG. 27 is a graph of the variation in radius of curvature for a first portion of an eyeglass lens constructed in accordance with a sixth embodiment of the invention.
Figure 28:
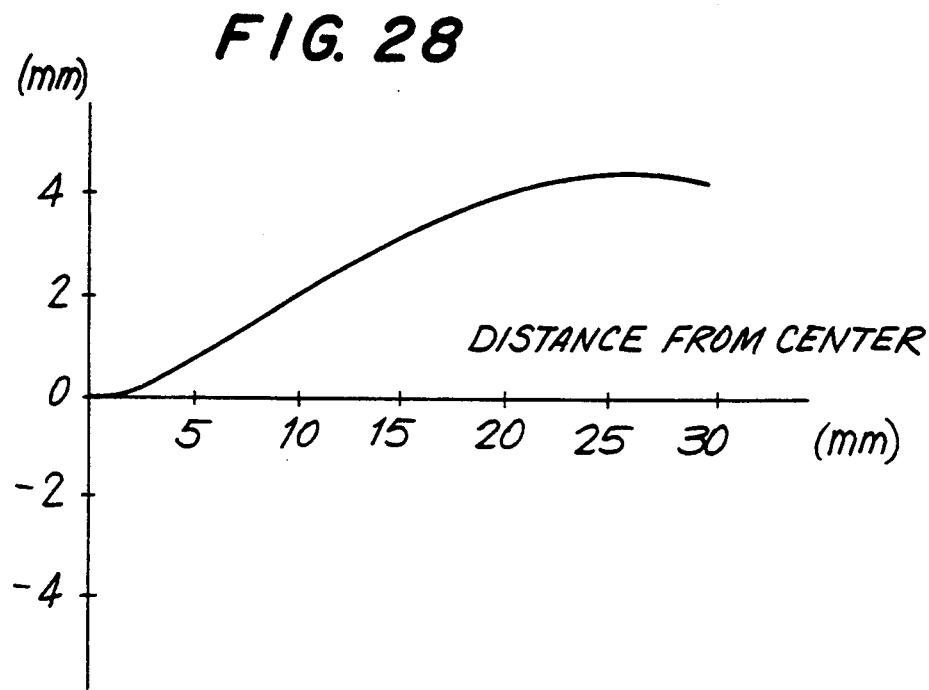
FIG. 28 is a graph of the variation in radius of curvature for another portion of the eyeglass lens constructed in accordance with the sixth embodiment of the invention.

A sixth embodiment for an eyeglass lens has a construction similar to that of eyeglass lens 140, having the shape exhibited by lens 140, the difference in structure being the variation in radius of curvature exhibited in FIGS. 27 and 28. The eyeglass lens constructed in accordance with the sixth embodiment has a degree of sphericalness S of −6.00 D. The degree of astigmatism C is −2.00 D. The diameter of the lens is 75 mm with a central section thickness of 1.0 mm. The material has a refractive index n=1.6. The front refracting surface 142 of eyeglass lens 140 constructed in accordance with the sixth embodiment of the invention has a spherical surface having a surface refracting power of 1.0 D, i.e., a radius of curvature of 600 mm. Rear refracting surface 144 is a spherical surface having a radius of curvature at the optical center 0 which is 85.71 mm along the meridian AOB and 66.66 mm along the meridian COD.

The radii of curvature along meridians AOB and COD varies from optical center O to the outer periphery of the eyeglass lens. The variation in radius of curvature along line segment OA is exhibited in FIG. 27. The variation in radius of curvature along line segment OB is exhibited in FIG. 28.

Figure 29:
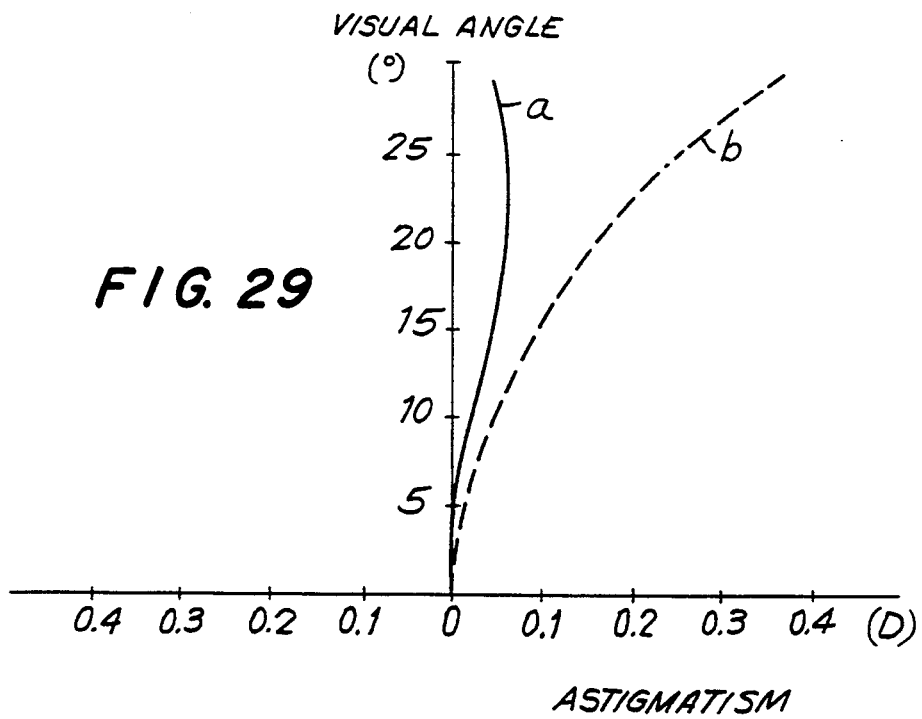
FIG. 29 is a graph of the astigmatism of one portion of the eyeglass lens constructed in accordance with the sixth embodiment of the invention.
Figure 30:
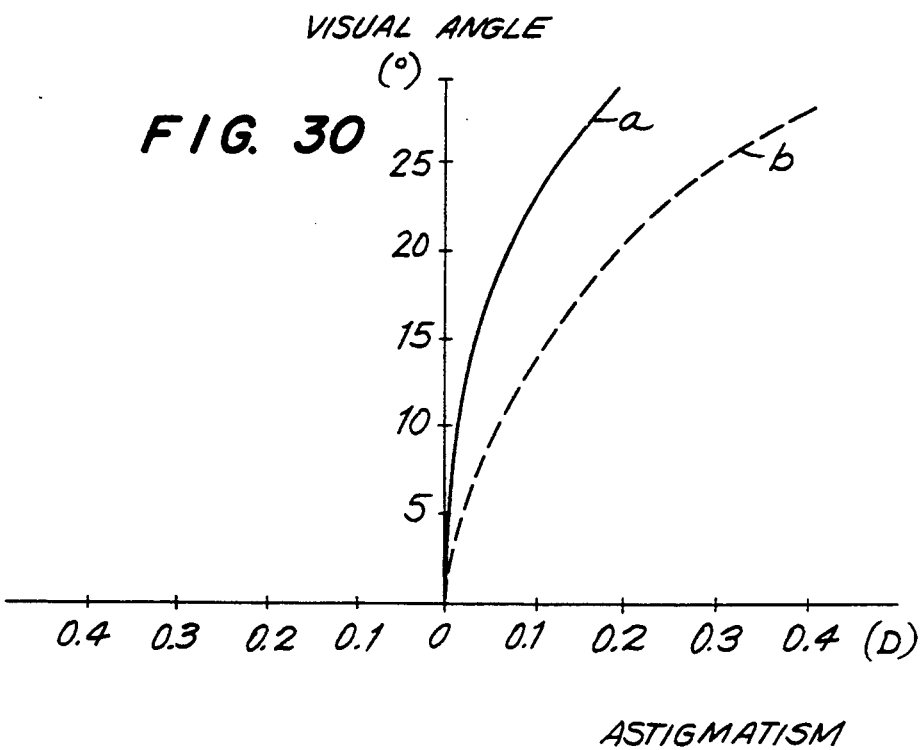
FIG. 30 is a graph of the astigmatism for a second portion of the eyeglass lens constructed in accordance with the sixth embodiment of the invention.

The astigmatism exhibited by the eyeglass lens is represented by line a of the graph of FIG. 29. The astigmatism in a conventional toric surface corrective lens adapted to the same specifications as shown by dotted line b. Similarly, the astigmatism exhibited by the eyeglass lens when viewing through line segment OC is represented by line a of FIG. 30 and the astigmatism exhibited when viewing through a conventional toric surface corrective lens adapted to the same specification is shown by broken line b.

Figure 31:
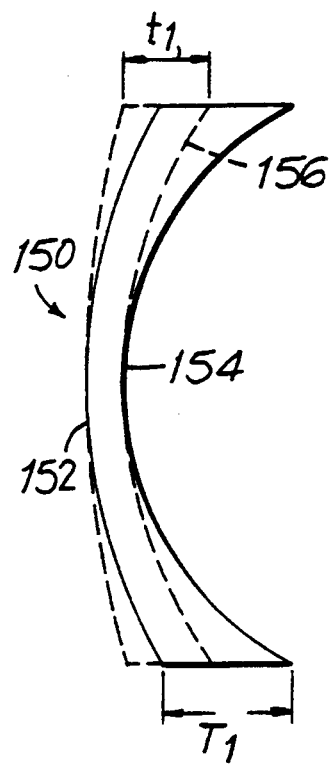
FIG. 31 is a sectional view of a concave lens constructed in accordance with a seventh embodiment of the invention.
Figure 32:
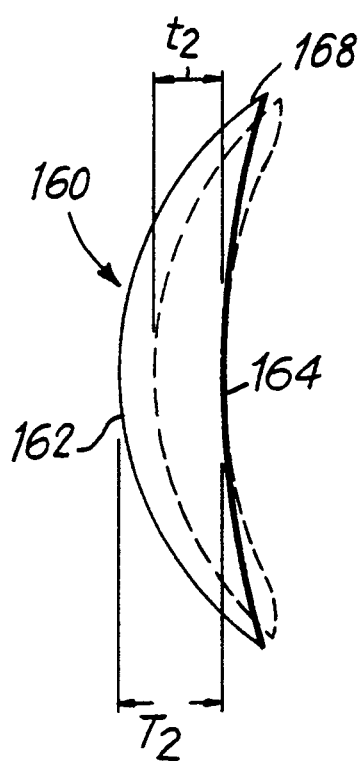
FIG. 32 is a sectional view of a convex lens constructed in accordance with the seventh embodiment of the invention.

Reference is now made to FIG. 31 which shows a sectional view of a concave lens (a minus lens), generally indicated as 150, constructed in accordance with the invention. In contradistinction thereto, FIG. 32 shows a convex lens (a plus lens), generally indicated as 160, constructed in accordance with the invention. The solid lines in each of the figures represent the sectional view of a conventional lens while the dotted lines represent the sectional view of the eyeglass lens constructed in accordance with the present invention.

A front refractive surface 152 of eyeglass lens 150 has a refracting power D where $$D=(n-1)/r$$

where n is the refractive index of front refractive surface 152, front refracting surface 152 is formed with a non-spherical surface having a minus refracting power which is smaller than that of the rear refractive surface 154. The region of front refracting surface 152 extending from the optical center to the periphery of the surface has an overall flattened configuration. Eyeglass lens 150 also includes a rear refracting surface 154 which is non-spherical having a larger refracting power in the region from the optical center to the periphery than the refracting power of front refracting surface 152. Rear refracting surface 154 is provided with a compensating surface 156 having a refracting power in the minus direction which compensates for deterioration in the optical performance of eyeglass lens 150 arising from the non-spherical configuration of front surface 152. The variation in the refracting powers in the minus direction with respect to the distance from the optical center along front refracting surface 152 for a concave lens of −6.00 D is provided in FIG. 34. Similarly, FIG. 35 shows the variation in refracting powers in the minus direction with respect to the distance along rear refracting surface 154 from the optical center towards the periphery.

By constructing a concave eyeglass lens such as eyeglass lens 150, the peripheral section of concave eyeglass lens 150 is raised a considerable degree when compared with the prior art eyeglass lens since the lens has an overall flattened appearance. Additionally, due to the non-spherical surface compensation provided by compensating surface 156, the edge thickness $t_1$ of concave eyeglass lens 150 is markedly smaller than the edge thickness $T_1$ of conventional eyeglass lens 158.

Figure 38:
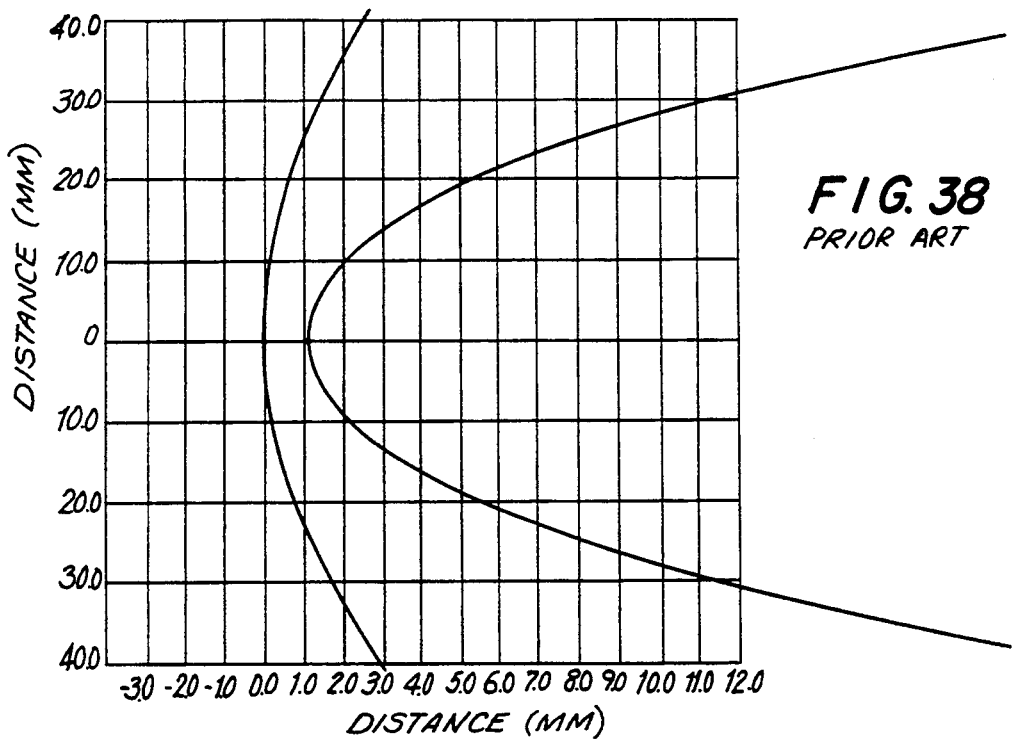
FIG. 38 is a graph representation of a sectional view of a double spherical lens constructed in accordance with the prior art.

The benefits that arise from such construction are exhibited in FIGS. 38–55. A comparison is made between a conventional double-sided spherical eyeglass lens, a conventional one-sided non-spherical eyeglass lens, and a conventional double-sided non-spherical eyeglass lens constructed in accordance with the invention. Each lens has a diameter of 75.0 mm and a central section thickness of 1.1 mm. Each are compared with each other in terms of configuration and degrees of astigmatism with respect to a long distance represented as 1000 m, a medium distance represented as 1 m and a short distance represented 0.3 m. FIG. 38 is a graphic representation of a sectional view of a −10 D double spherical eyeglass lens constructed in accordance with the prior art. As can be seen, the eyeglass lens of FIG.

38 has an edge thickness of 15.8 mm. The one-sided non-spherical lens shown in FIG. 40 has an edge thickness of 15.91 mm. This is in contrast to the −10 D concave lens of FIG. 42, constructed in accordance with the invention, which exhibits a substantially reduced edge thickness of 14.13 mm. This edge will be made even smaller within the eyeglass frame.

Figure 39:
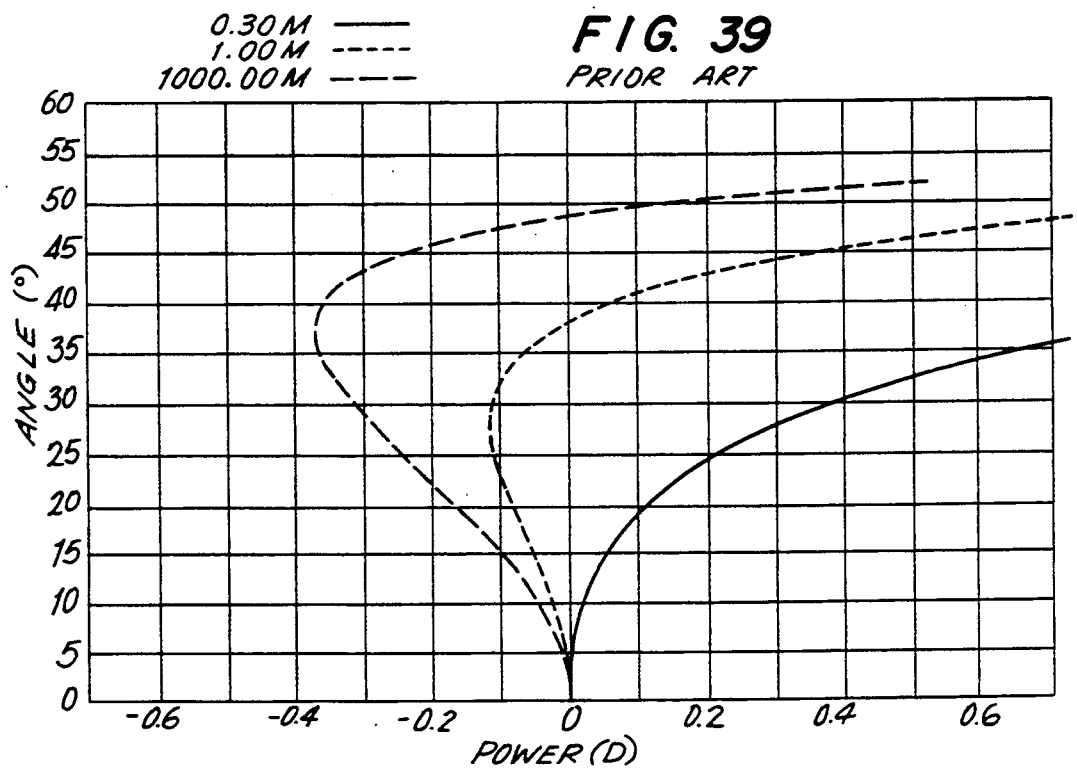
FIG. 39 is a graph of the astigmatism of the eyeglass lens constructed in accordance with the prior art.
Figure 40:
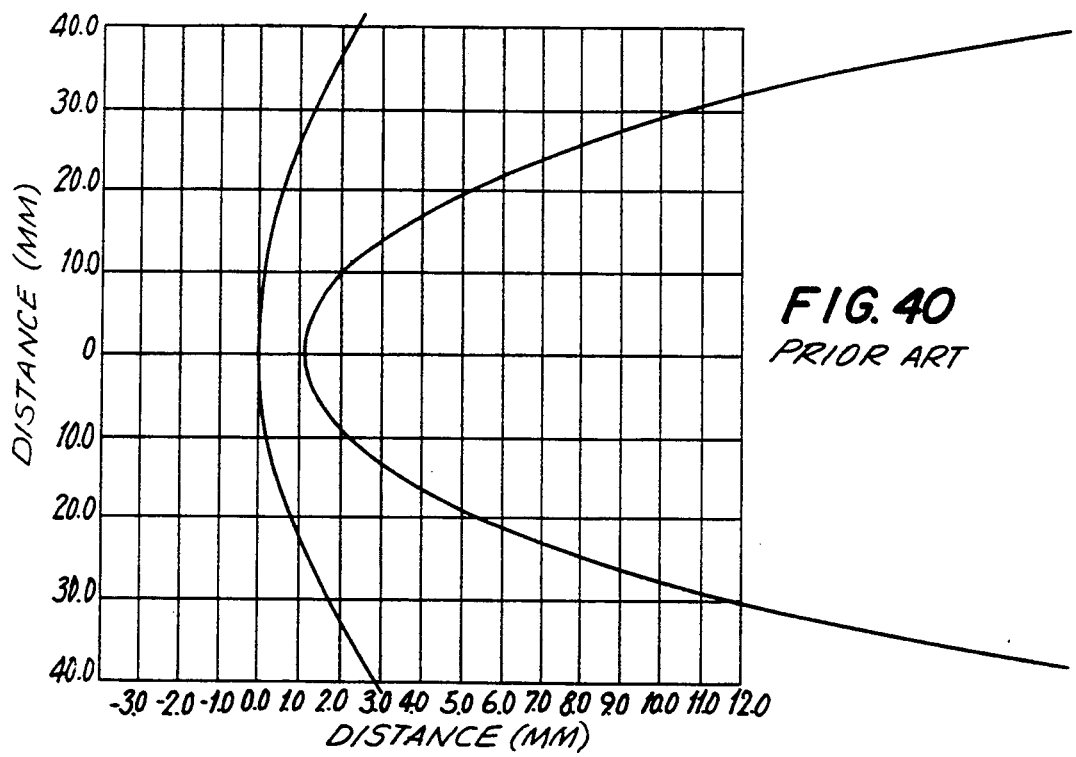
FIG. 40 is a graph representation of a one-sided non-spherical eyeglass lens constructed in accordance with the invention.
Figure 41:
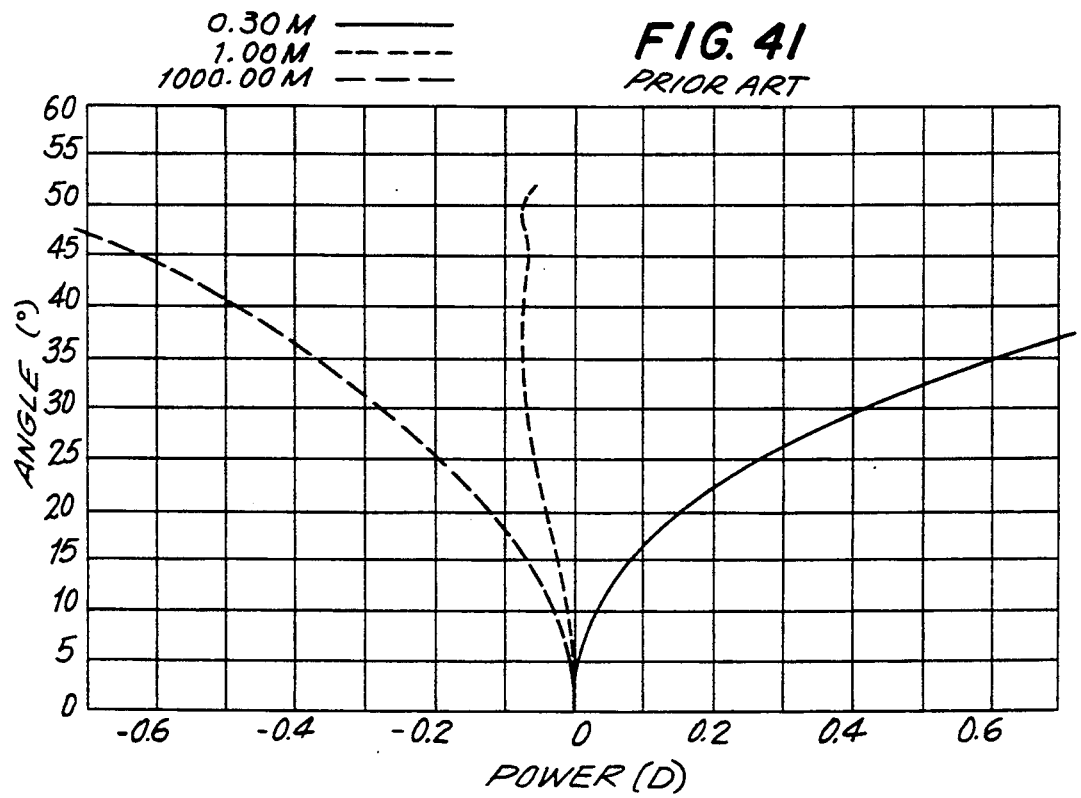
FIG. 41 is a graph of the astigmatism of the one-sided non-spherical eyeglass lens constructed in accordance with the prior art.
Figure 42:
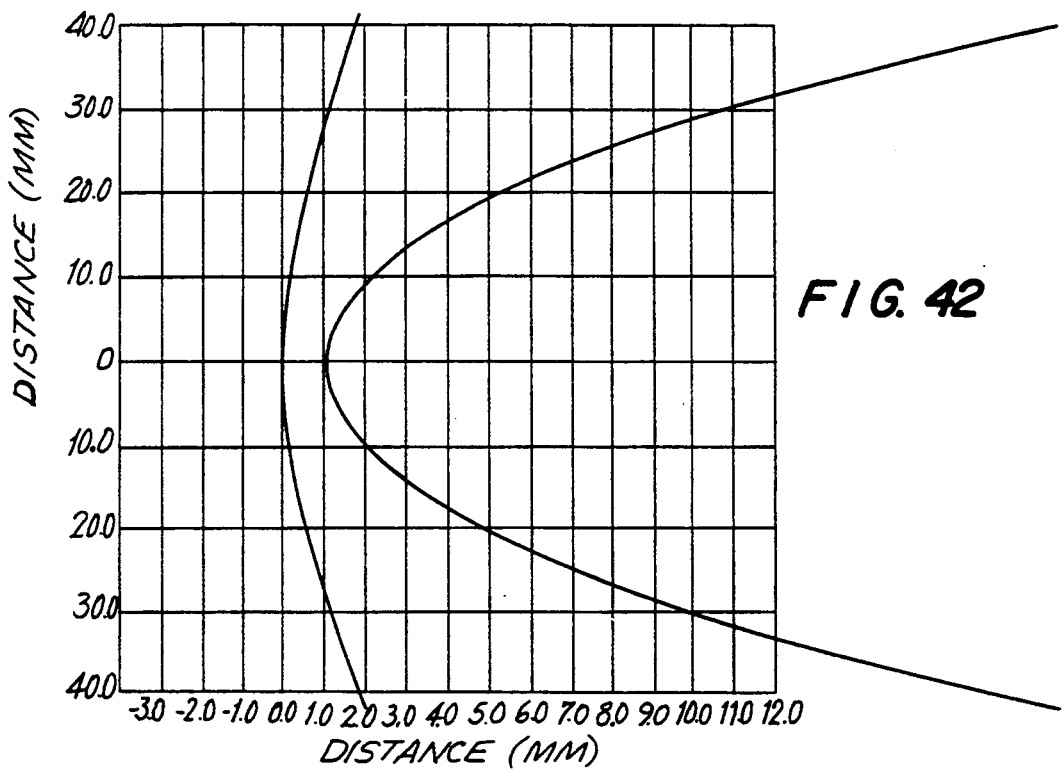
FIG. 42 is a graph representation of a sectional view of a double-sided non-spherical lens constructed in accordance with the invention.
Figure 43:
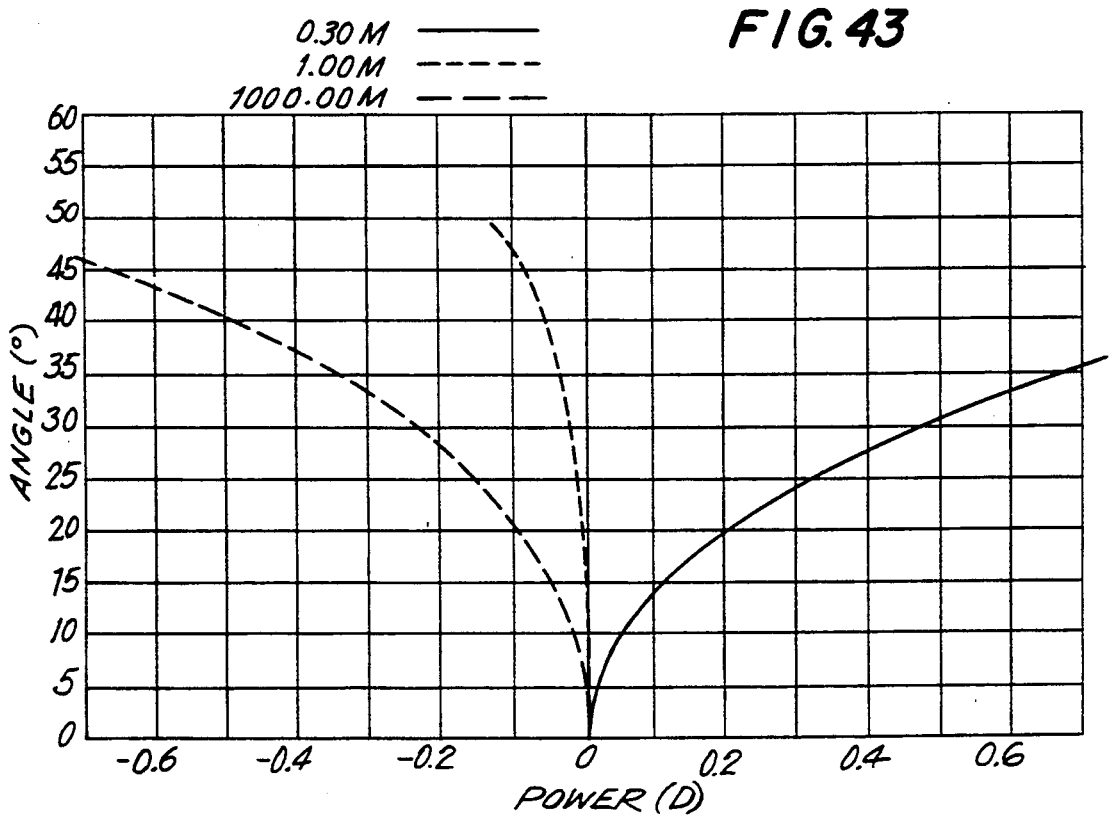
FIG. 43 is a graph of the astigmatism of the eyeglass lens of FIG. 42.

FIGS. 39, 41 and 43 show the astigmatism exhibited by the eyeglass lenses graphed in respective FIGS. 38, 40 and 42. The long dash line corresponds to the astigmatism resulting from objects viewed at a long distance, the short dash line corresponds to astigmatism exhibited at the medium distance and the sold line corresponds to astigmatism exhibited at the short distance. The astigmatism with respect to the medium distance is compensated for more satisfactorily by the one-sided non-spherical lens of FIG. 40 than in the double spherical eyeglass lens of FIG. 38. However, correction of astigmatism of approximately the same level as in the one-sided non-spherical lens of FIG. 40 is provided by the double non-spherical lens constructed in accordance with the invention of FIG. 42 as seen in FIG. 43.

Figure 44:
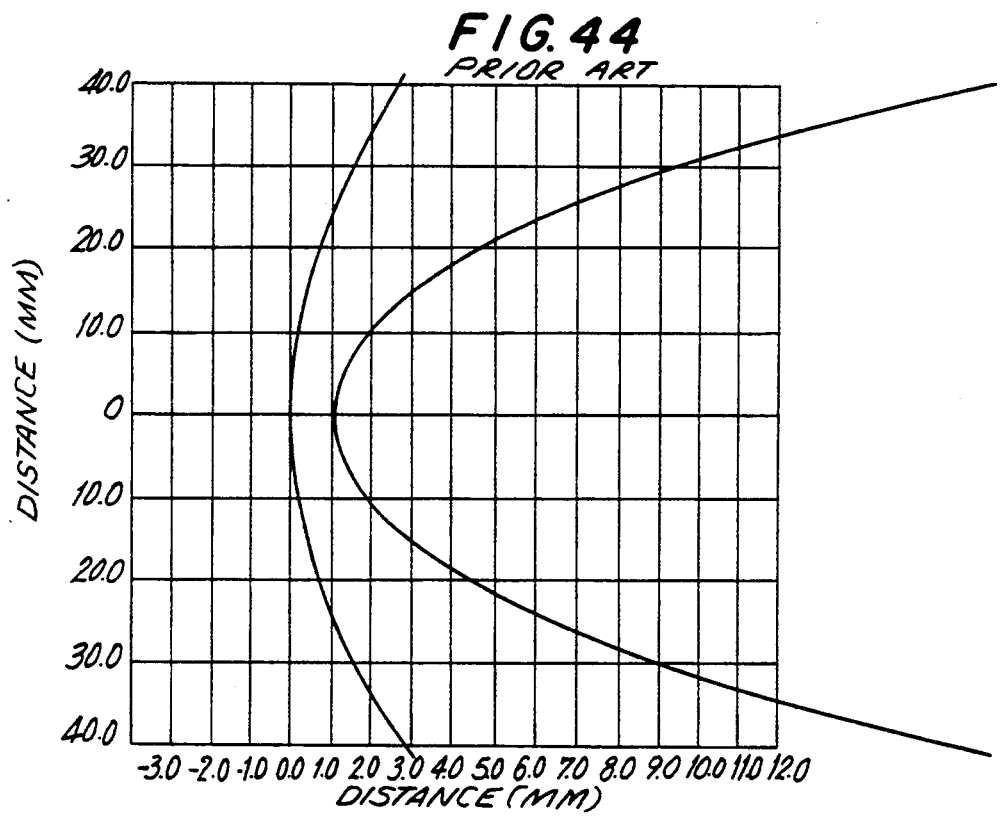
FIG. 44 is a graphic representation of a sectional view of a concave double-spherical lens constructed in accordance with the prior art.
Figure 45:
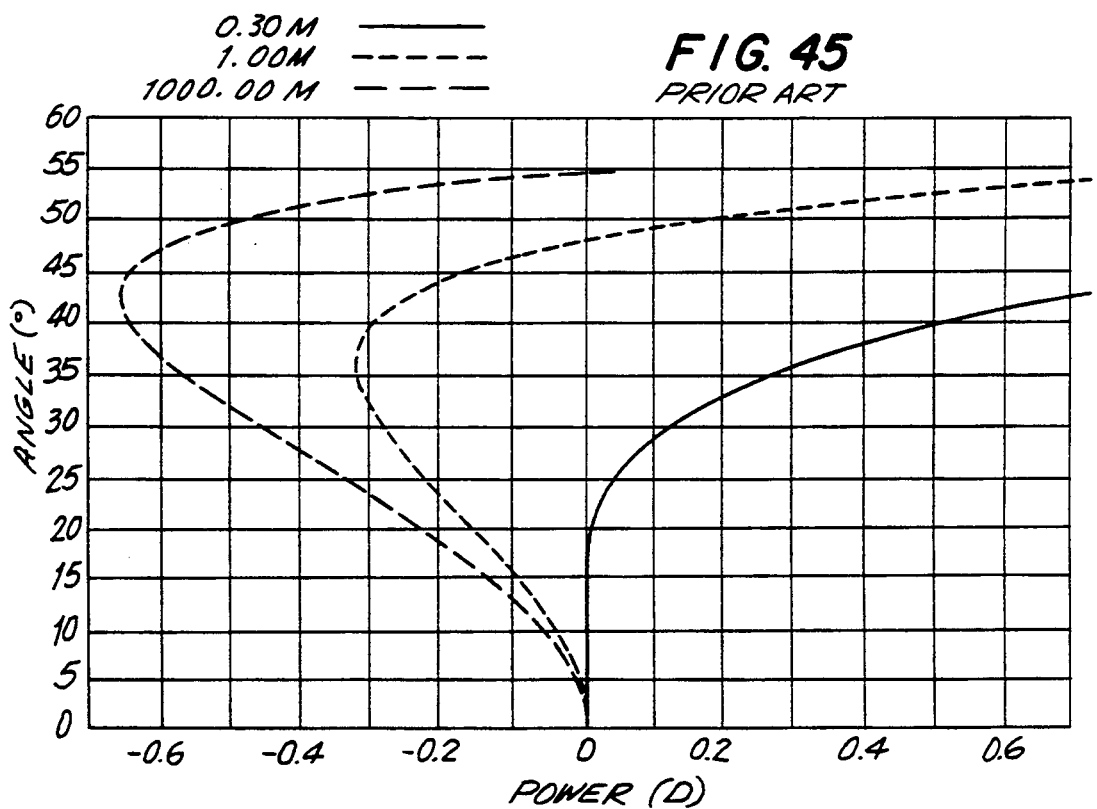
FIG. 45 is a graph of the astigmatism of the eyeglass lens of FIG. 44.
Figure 46:
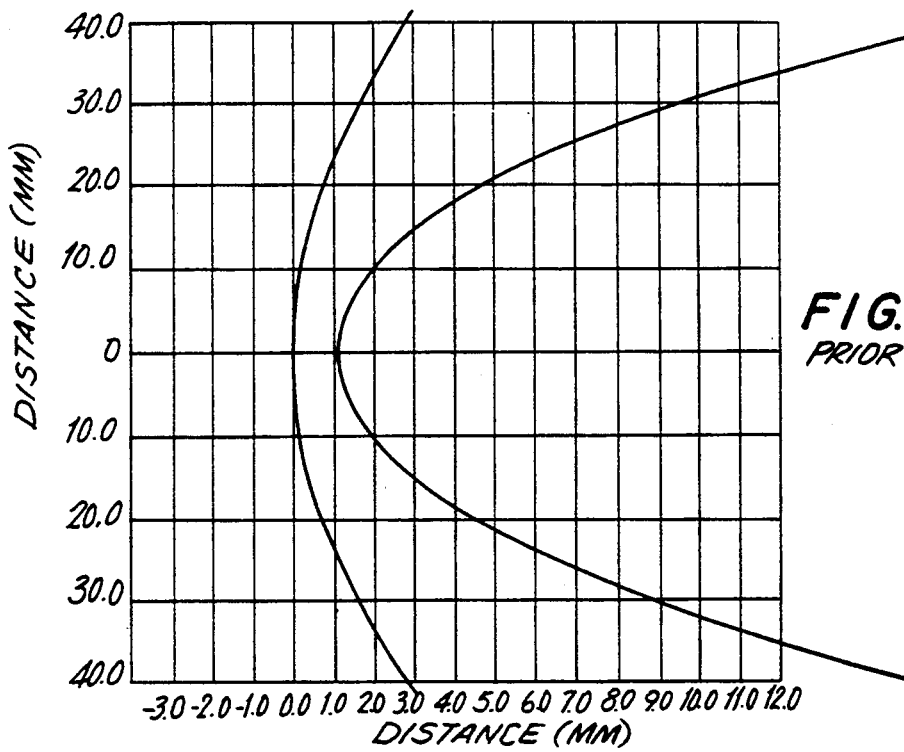
FIG. 46 is a graphic representation of a sectional view of a one-sided non-spherical eyeglass lens constructed in accordance with the prior art.
Figure 47:
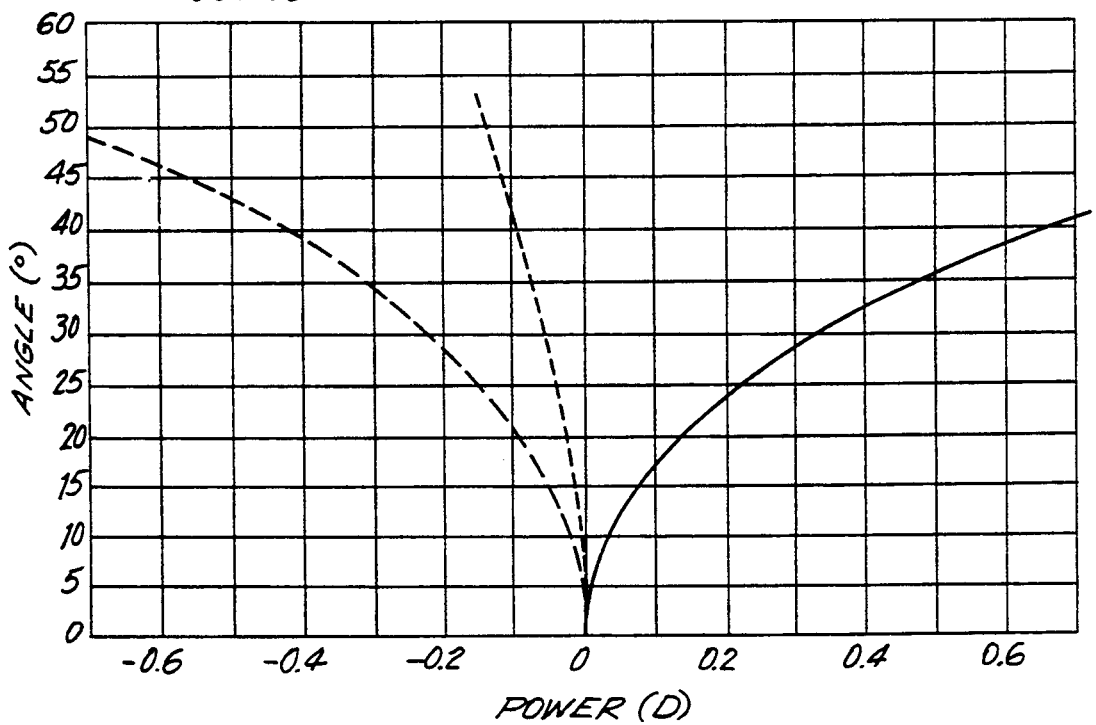
FIG. 47 is a graphic of the astigmatism of the eyeglass lens of FIG. 46.
Figure 48:
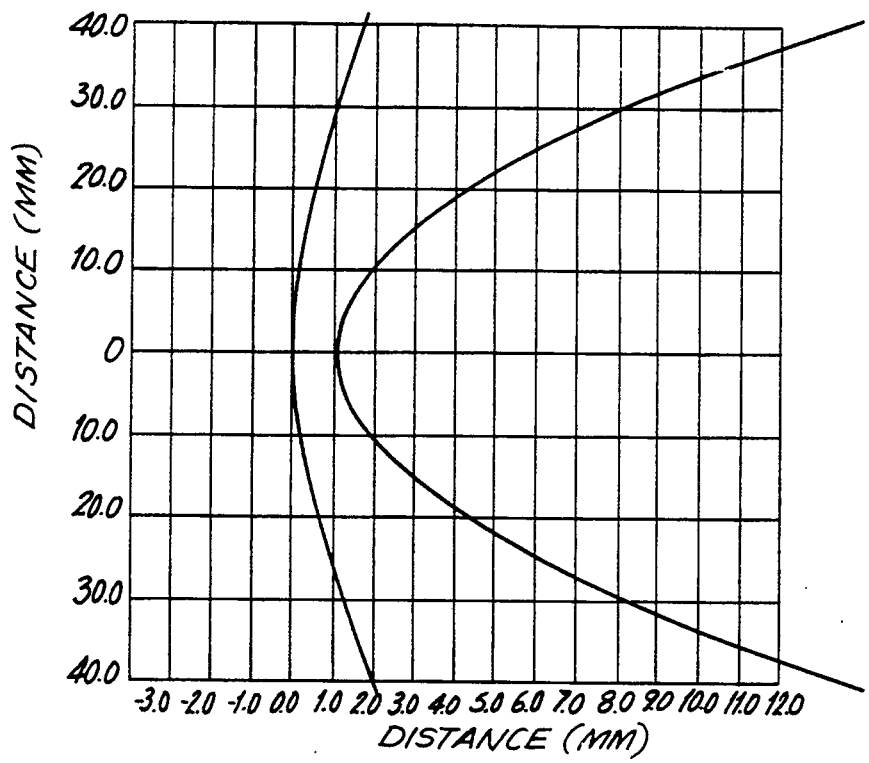
FIG. 48 is a graphic representation of a sectional view of a double-sided non-spherical eyeglass lens constructed in accordance with the invention.
Figure 49:
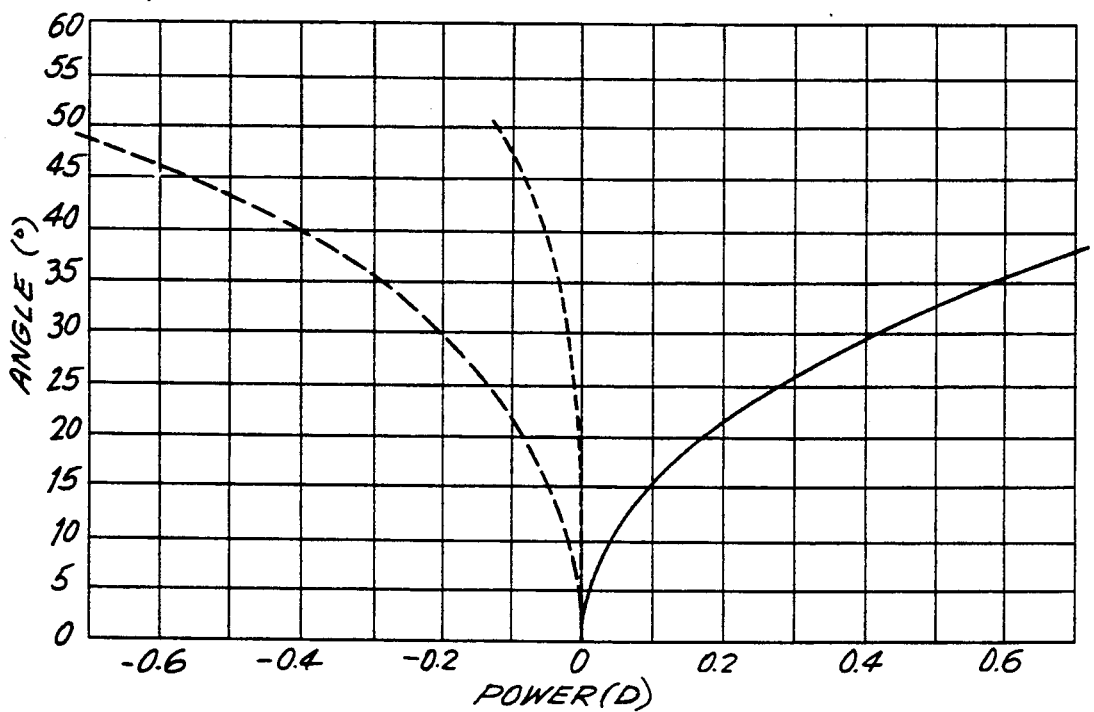
FIG. 49 is a graph of the astigmatism of the lens of FIG. 48.

Turning now to FIGS. 44–51, a conventional double spherical lens, a conventional one-sided non-spherical lens and a double-sided non-spherical lens constructed in accordance with the invention are shown in graphic representations of sectional views in FIGS. 44, 46 and 48, respectively. The concave lens of these embodiments has a power of −8.0 D. As can be seen from FIG. 44 the double-sided spherical lens has an edge thickness of 12.04 mm. The conventional one-sided non-spherical lens has an edge thickness of 11.87 mm. In contrast thereto, the lens thickness of the double-sided non-spherical lens constructed in accordance with the invention has an edge thickness as small as 10.52 mm as seen in FIG. 48. FIGS. 45, 47 and 49 graphically represent the astigmatism compensation for the lenses of FIGS. 44, 46 and 48, respectively. As in the case of the 10 D lens, the astigmatism compensation provided by the lens of FIG. 48 constructed in accordance with the invention is satisfactory with respect to the medium distance 1 m when compared to the prior art lenses of FIG. 44 and FIG. 46.

Reference is now made to FIGS. 50–55 in which a conventional double spherical lens (FIGS. 50, 51), a conventional one-sided non-spherical lens (FIGS. 52–53) and a double-sided non-spherical lens constructed in accordance with the invention (FIGS. 54, 55) being formed as concave lenses of −6.0 D power are compared. As can be seen from FIG. 56, the edge thickness of the double spherical lens is 8.88 mm. As can be seen from FIG. 52, the edge thickness of the one-sided non-spherical lens is 8.52 mm. However, as can be seen from FIG. 54, the double-sided non-spherical lens constructed in accordance with the invention has an edge thickness of only 7.59 mm.

Figure 50:
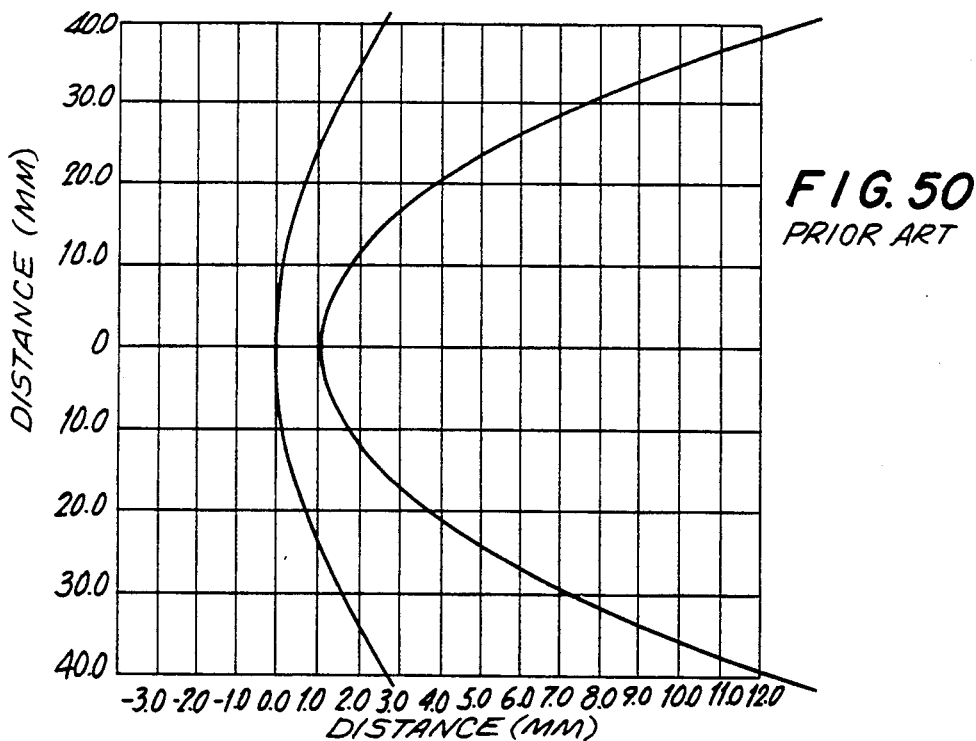
FIG. 50 is a graphic representation of a sectional view of a double-sided spherical eyeglass lens constructed in accordance with the prior art.
Figure 51:
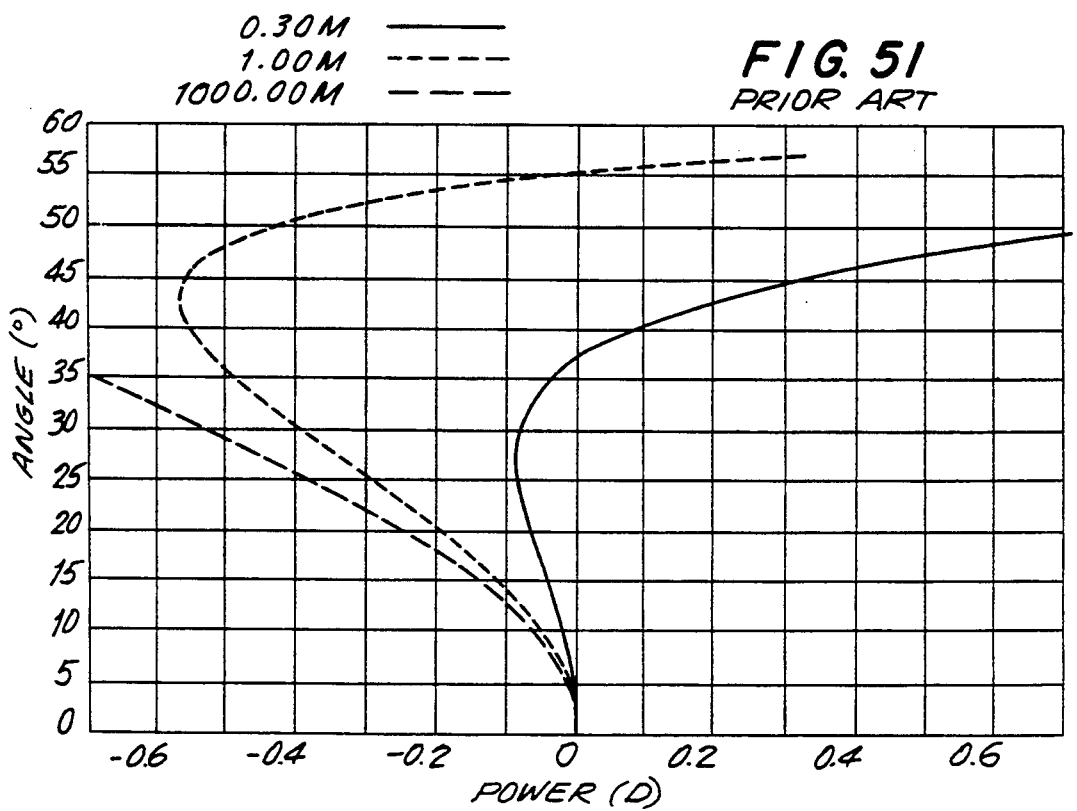
FIG. 51 is a graph of the astigmatism of the lens of FIG. 50.
Figure 52:
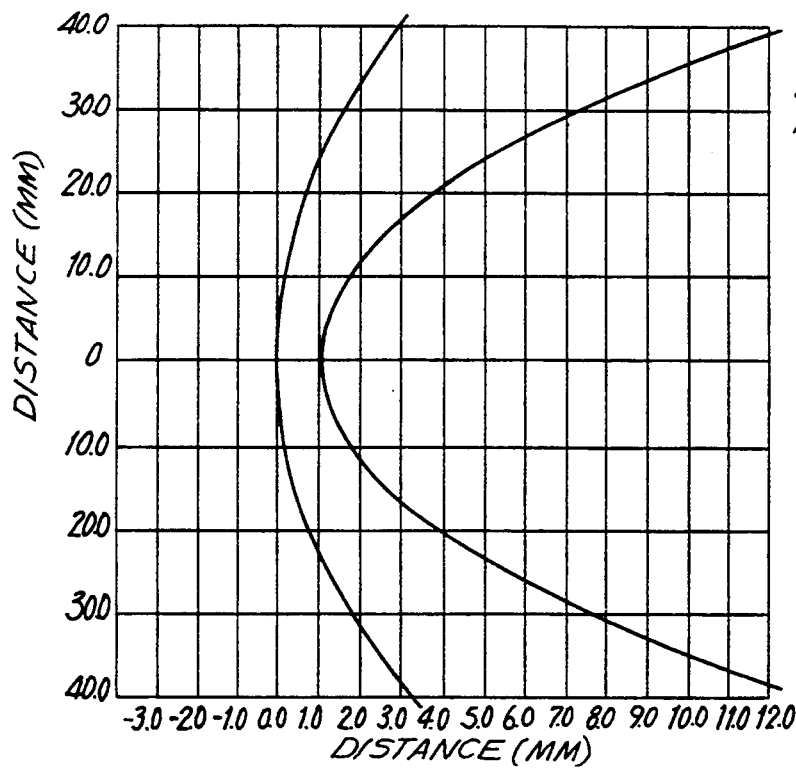
FIG. 52 is a graphic representation of a sectional view of a one sided non-spherical lens constructed in accordance with the prior art.
Figure 53:
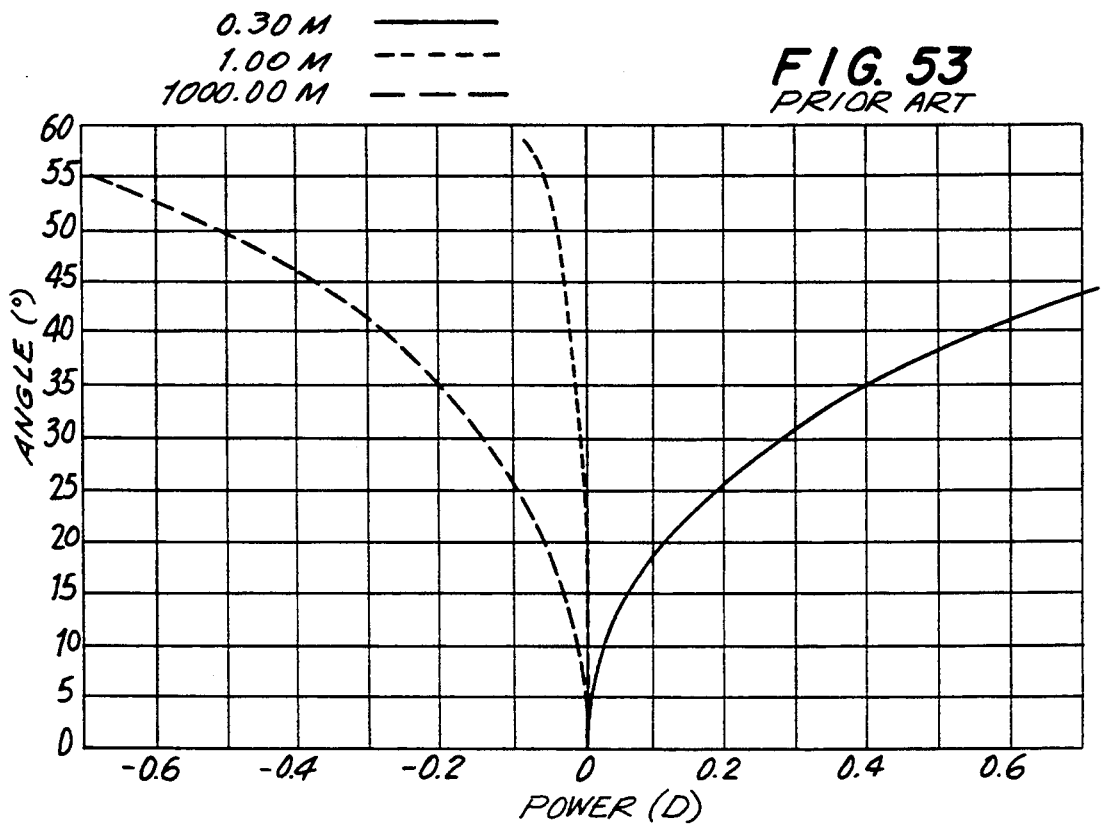
FIG. 53 is a graph of the astigmatism of the lens of FIG. 52.
Figure 54:
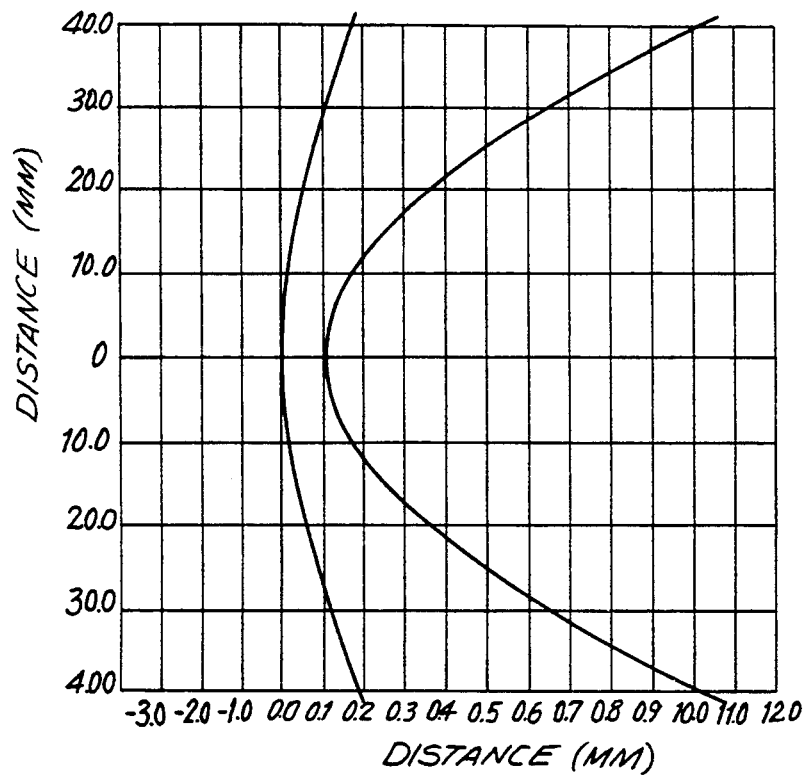
FIG. 54 is a graphic representation of a sectional view of a double-sided non-spherical eyeglass lens constructed in accordance with the invention.
Figure 55:
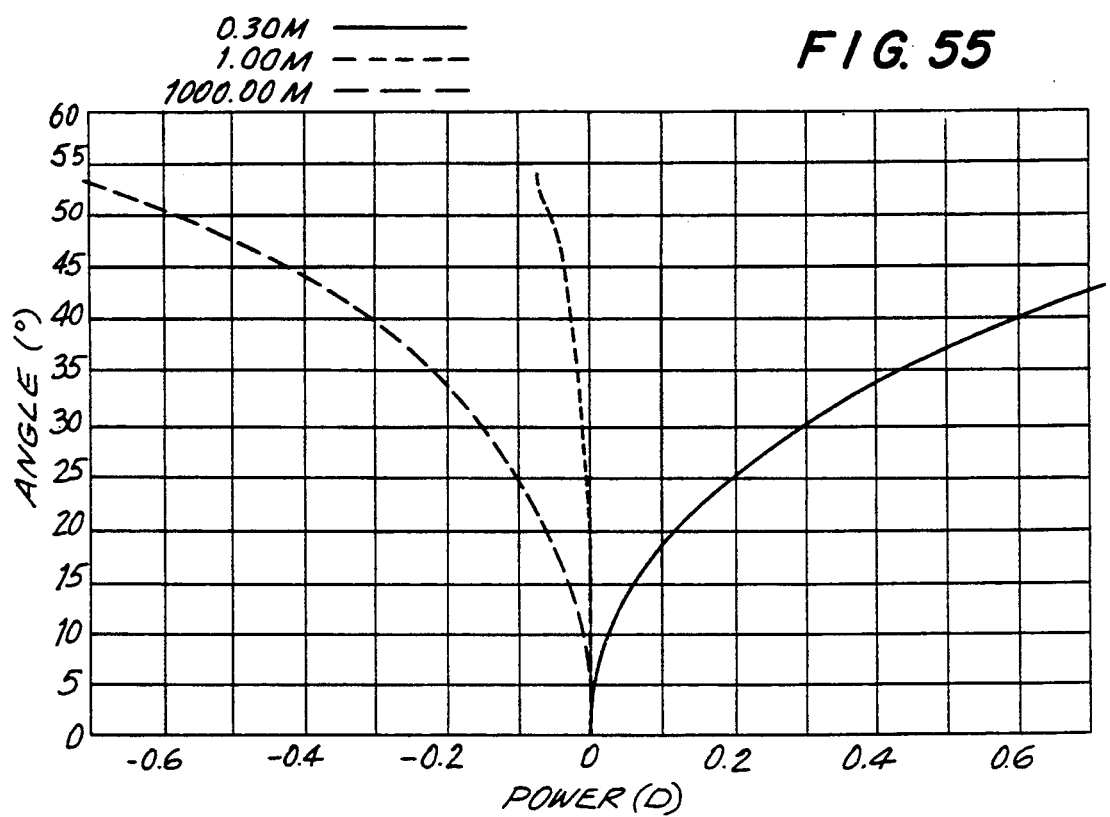
FIG. 55 is a graph of the astigmatism of the eyeglass lens of FIG. 54.

Again, FIGS. 51, 53 and 55 exhibit the astigmatism for the lenses shown in FIGS. 50, 52 and 54, respectively. Additionally, as occurred above, the astigmatism with respect to the medium distance 1 m is compensated for more satisfactorily by the conventional one-sided non-spherical lens of FIG. 52 as can be seen from FIG. 53 than by the double-sided spherical lens of FIG. 50 as seen in FIG. 51. However, an astigmatism compensation approximately the same as that exhibited by the one-sided non-spherical lens of FIG. 52 is exhibited by the double-sided non-spherical lens constructed in accordance with the invention as seen in FIG. 55.

It follows that by constructing such a concave lens, a minus refracting power is imparted to a region extending from the optical center to the periphery along front refracting surface 152 where front refracting surface 152 has a smaller refracting power than the rear refracting surface 154, making it possible to form front refracting surface 152 as a substantially flat surface. A compensating surface 156 formed on rear refracting surface 154 protrudes forwardly to compensate for the effect of the flattened configuration of front refracting surface 152 so that rear refracting surface 154 can also have a substantially flattened configuration so that the edge thickness $t_1$ of the concave lens 150 constructed in accordance with the invention is substantially reduced. Additionally, concave lens 150 results in a lens in which astigmatism compensation can satisfactorily be obtained and by virtue of the flattened configuration of the entire concave lens 150, the forward protrusion of the lens when fitted into a frame is reduced, thereby substantially improving the aesthetic appearance of the eyeglasses when worn.

Figure 36:
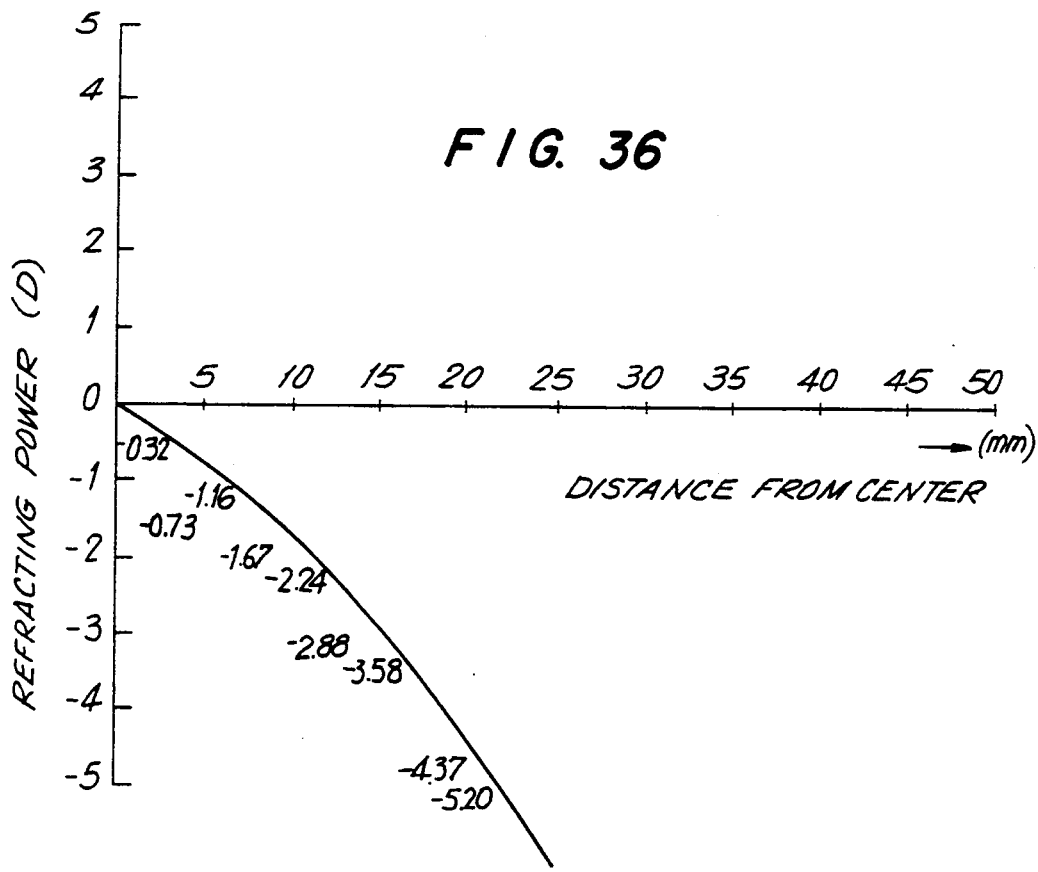
FIG. 36 is a graph of the variation in refracting power along the front refractive surface of the convex lens constructed in accordance with the seventh embodiment of the invention.
Figure 37:
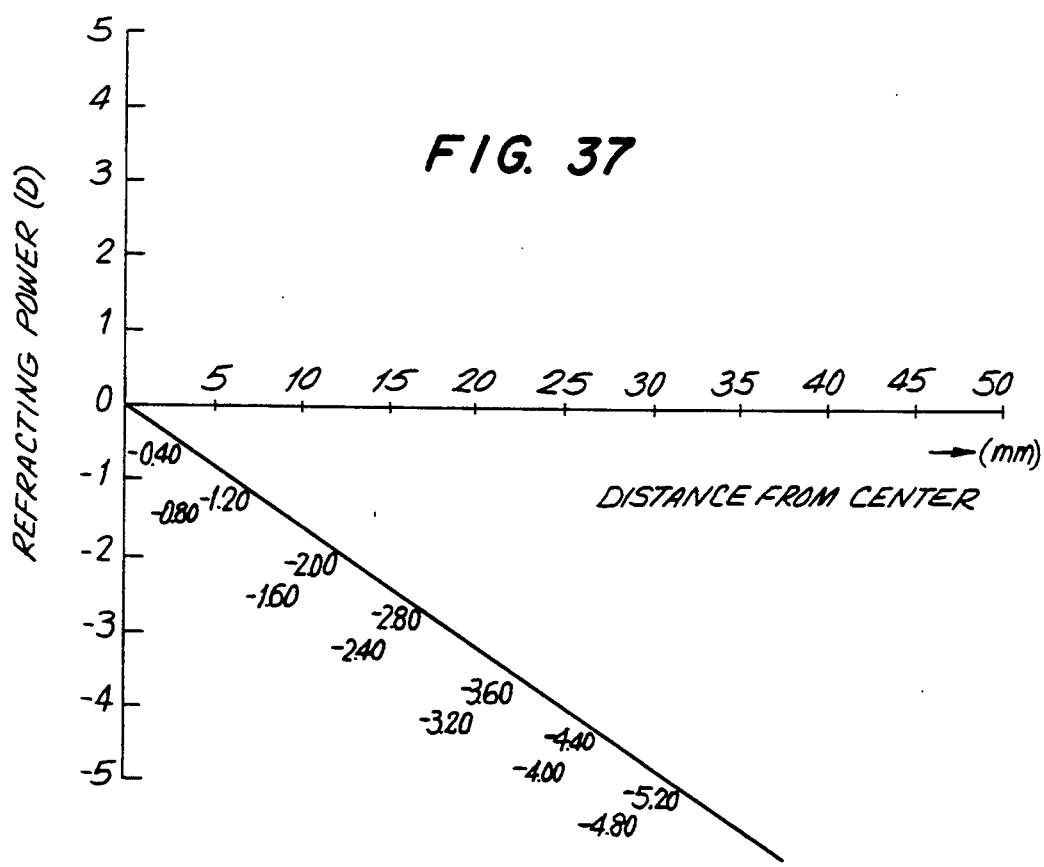
FIG. 37 is a graph of the variation in refracting power of the rear refractive surface of the convex lens constructed in accordance with the seventh embodiment of the invention.

Turning to FIG. 32, a convex lens 160 constructed in accordance with the invention is provided. Convex lens 160 includes a rear refracting surface 164 having a refracting power D which is smaller than that of front refracting surface 162. A refracting force of a minus direction is imparted to the region extending from the optical center to the periphery of rear refracting surface 164, making it possible to form rear refracting surface 164 as a flatted non-spherical surface. Front refracting surface 162 having a larger refracting power D has a region from the optical center of front refracting surface 162 to the periphery of the front refracting surface 162 forms as a compensating surface 166 which has a refracting power in the minus direction and is adapted to compensate for the deterioration in optical performance of lens 160 arising from the non-spherical configuration of rear refracting surface 164. This structure results in the rear refracting surface 164 being raised and the compensating surface 166 of front refracting surface 162 protrudes forwardly so that the central section thickness $t_2$ of convex lens 160 is substantially reduced as compared with central section thickness $T_2$ of a conventional convex lens 168. The variation of the power for a convex lens of +6.00 D with respect to the distance from the optical center of front refracting surface 162 is shown in FIG. 36. The variation in power along the rear refracting surface 164 extending from the optical center to the periphery is shown in FIG. 37.

Figure 56:
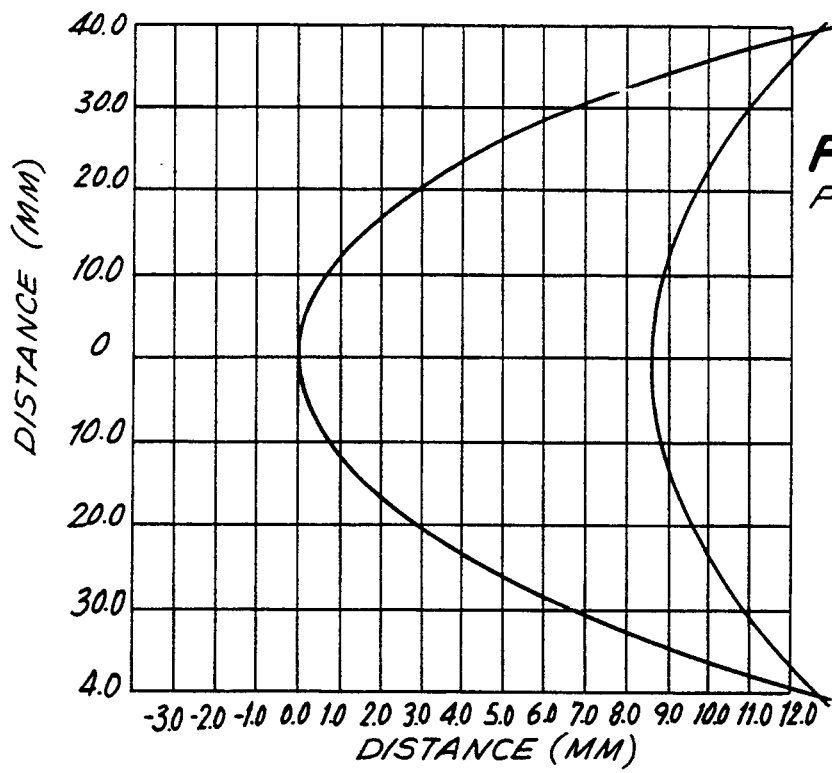
FIG. 56 is a graphic representation of a sectional view of a double-sided spherical eyeglass lens constructed in accordance with the prior art.
Figure 57:
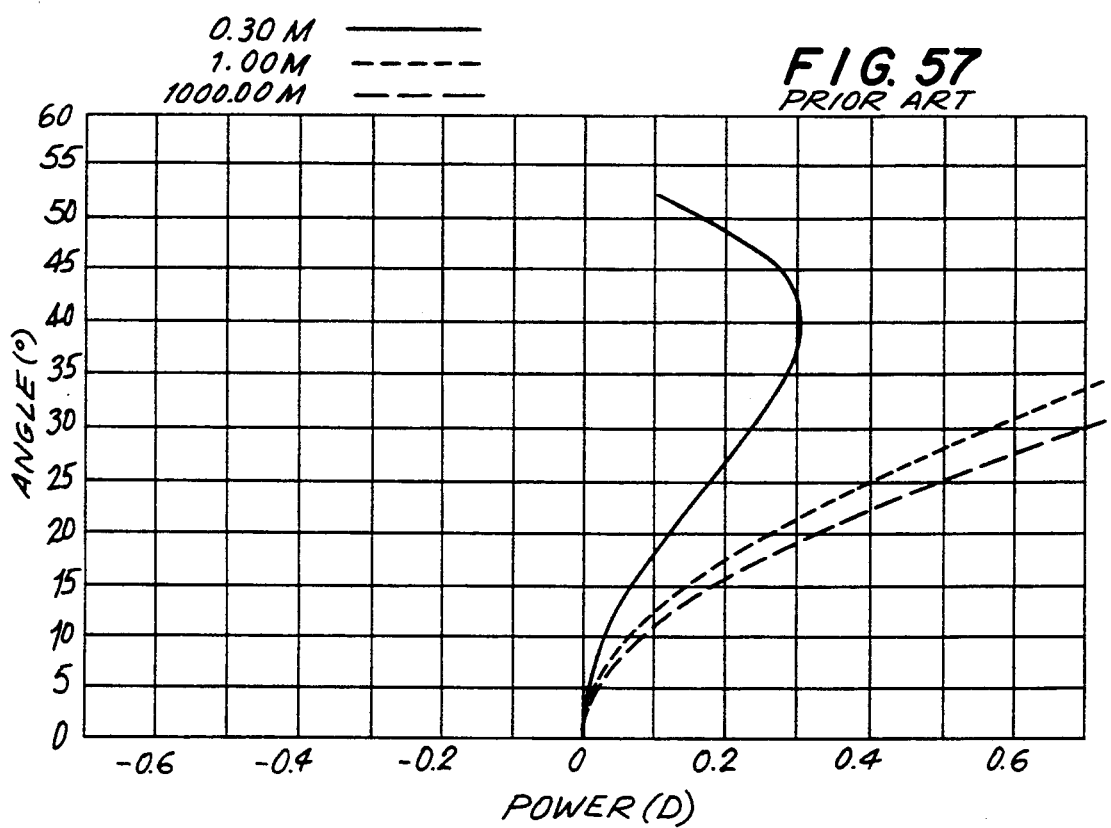
FIG. 57 is a graph of the astigmatism of the eyeglass lens of FIG. 56.
Figure 58:
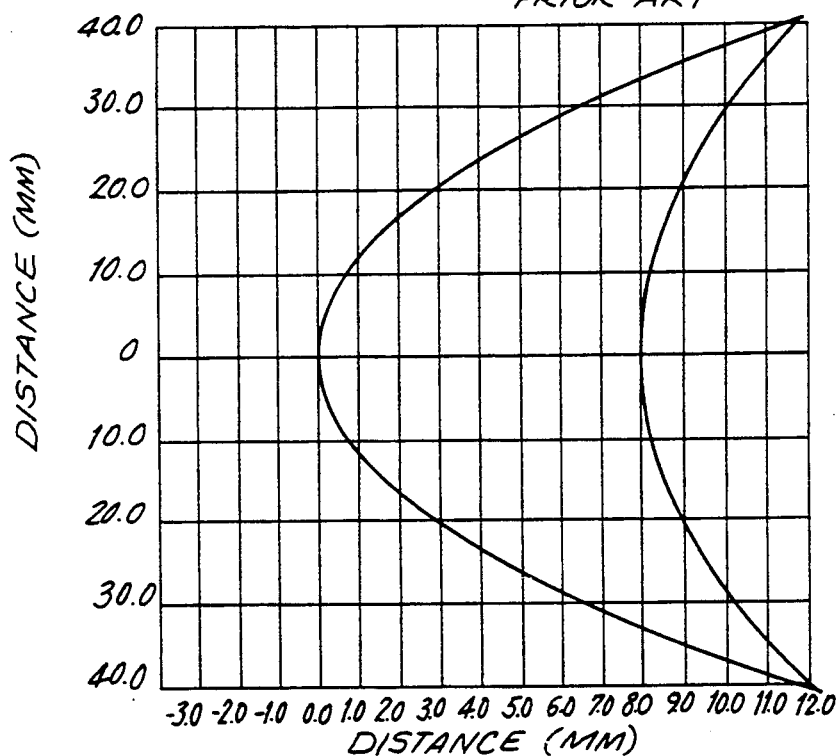
FIG. 58 is a graphic representation of a sectional view of a double-sided spherical lens constructed in accordance with the prior art.
Figure 59:
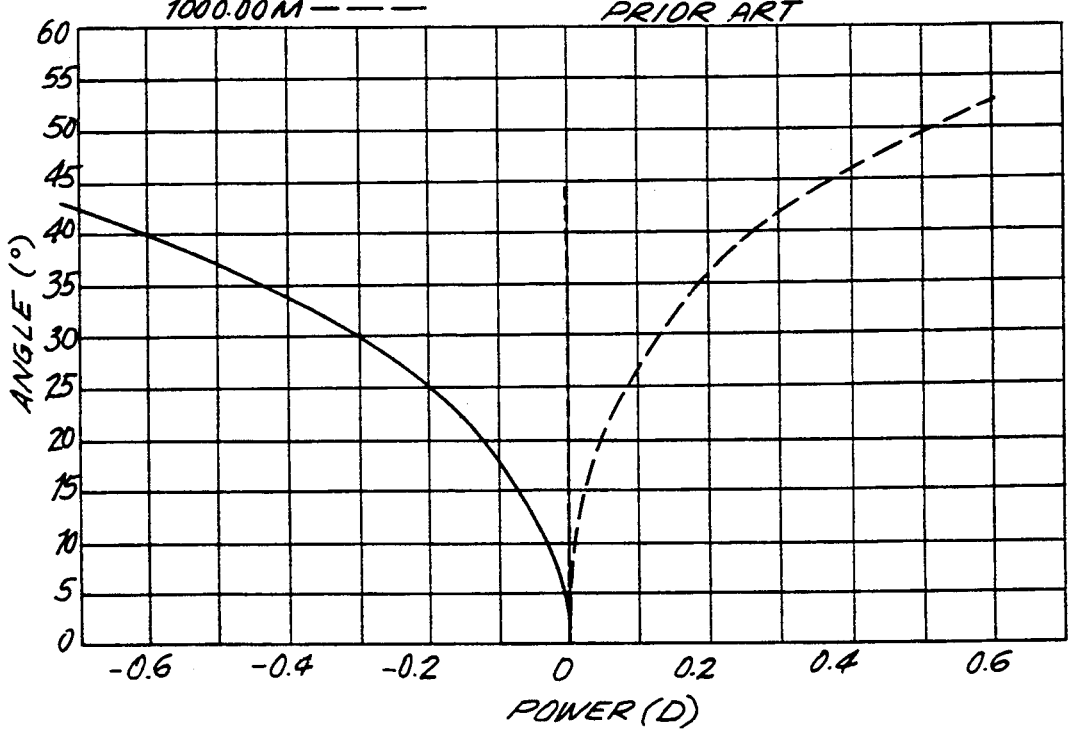
FIG. 59 is a graph of the astigmatism of the eyeglass lens of FIG. 58.
Figure 60:
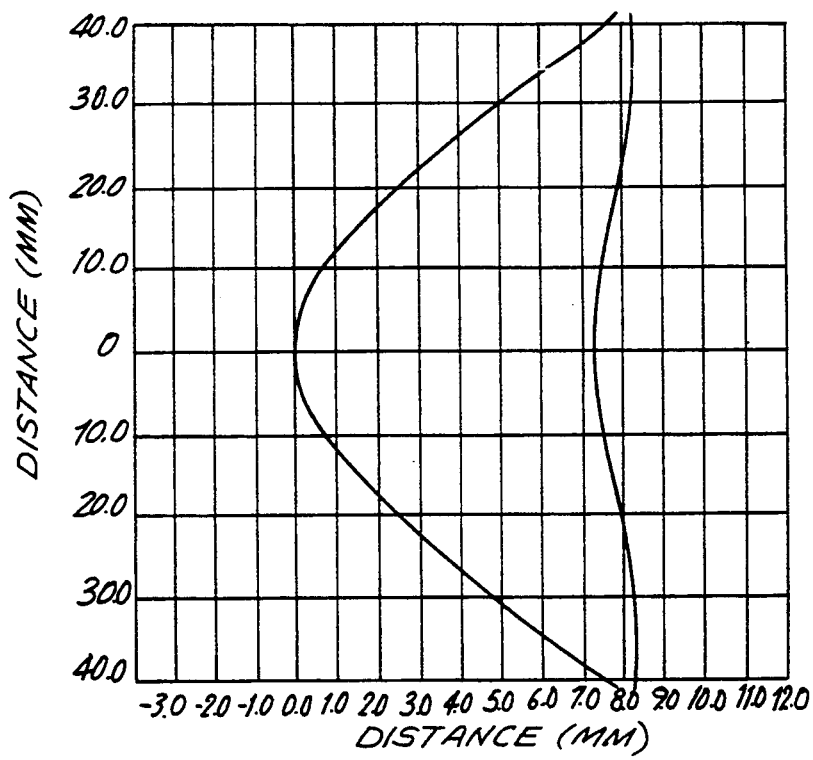
FIG. 60 is a graphic representation of a double-sided non-spherical lens constructed in accordance with the invention.
Figure 61:
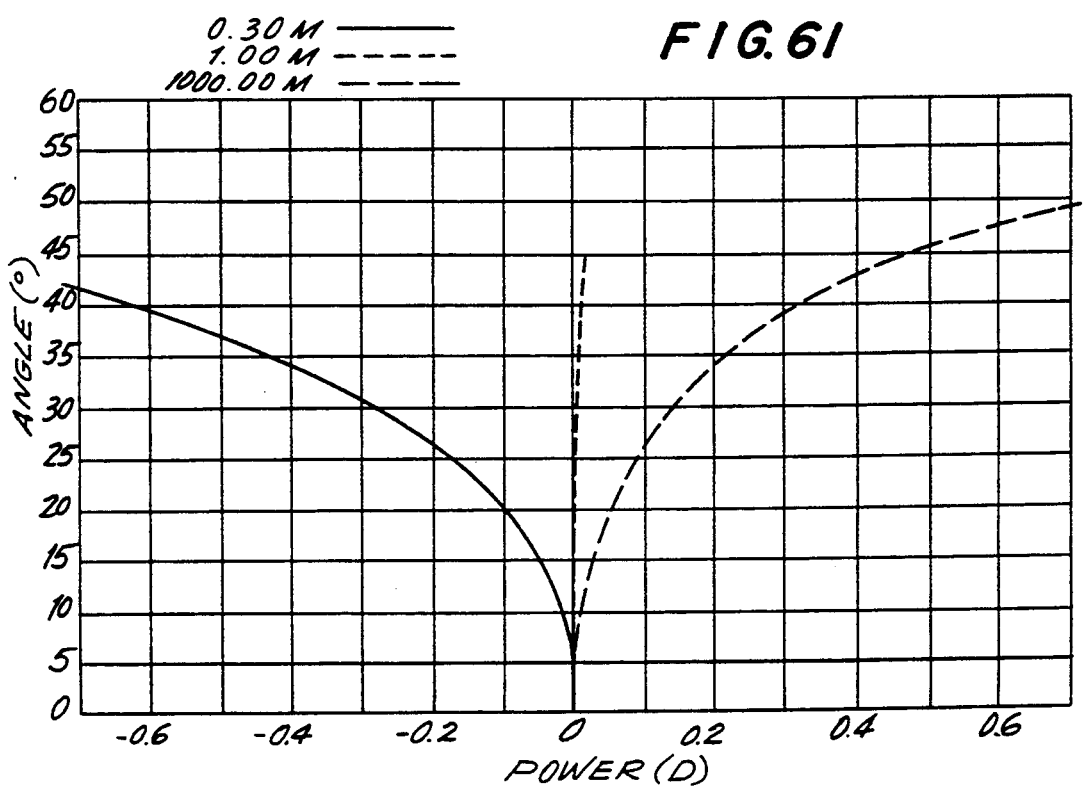
FIG. 61 is a graph of the astigmatism of the eyeglass lens of FIG. 60.

The benefits of the structure of convex lens 160 are illustrated in FIGS. 56–61 showing different powered embodiments of the prior art compared to different powered embodiments of a lens constructed in accordance with the invention. FIGS. 56, 58 and 60 graphically represent sectional views of respective convex lenses. FIGS. 57, 59 and 61 graphically represent the astigmatism of the lenses of FIGS. 56, 58 and 60, respectively. Each of the lenses is a +6.0 D lens having a diameter of 75 mm and an edge thickness of 1.22 mm. Astigmatism is compared with respected to a long distance, 1000 m, a medium distance 1 m, and a short distance 0.3 m. Again, the long distance in each of graphs 57, 59 and 61 is represented by the long dash line, the intermediate distance is represented by the short dash line and the short distance is represented by the solid line. As seen in FIG. 56, the central thickness of a conventional double-sided spherical lens is 8.63 mm. As seen in FIG. 58, the central section thickness of a conventional one-sided non-spherical lens is 7.92 mm. In comparison thereto, as seen in FIG. 60, the lens having the above specification constructed in accordance with the invention has a central thickness of only 7.30 mm. Additionally, as seen in FIG. 56, the conventional double-sided spherical lens of FIG. 56 exhibits a severe astigmatism with respect to all three distances. On the other hand, the astigmatism is fairly well compensated for by the conventional one-sided non-spherical lens of FIG. 59. The lens constructed in accordance with the invention as shown in FIG. 60 also effectively compensates astigmatism as seen in FIG. 61 to approximately the same degree as that in the thicker prior art lens of FIG. 58.

Thus, as discussed above in connection with minus power lenses, by applying different size refractive surfaces and a compensation surface to plus power lenses, the central section thickness $t_2$ is greatly reduced. Additionally, the peripheral section of rear refractive surface 164 is raised and the forward protrusion of the central section of front refractive surface 162 is reduced so that the forward protrusion of lens 160 when fitted into eyeglass frames is mitigated, thereby improving the overall aesthetics of the eyeglasses when worn.

Figure 33:
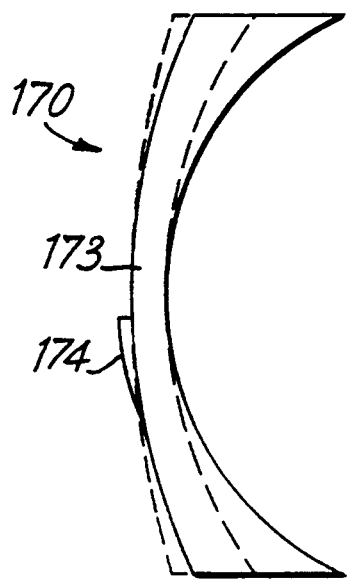
FIG. 33 is a sectional view of a bifocal lens constructed in accordance with the seventh embodiment of the invention.

While the above embodiments have illustrated monofocal lenses, they are used by way of example. As seen in FIG. 33, the construction of the invention is equally applicable to a bifocal lens or trifocal lens. Bifocal lens 170 is formed with a main lens 173 and a lens segment 174. Lens segment 174 is formed on a convex side of main lens 3. Constructing lens 170 in accordance with the specification discussed above, results in a bifocal or trifocal lens having a minus lens with a thinner edge and a plus lens having a thinner central section than the prior art as shown by the dotted line portion.

Figure 62:
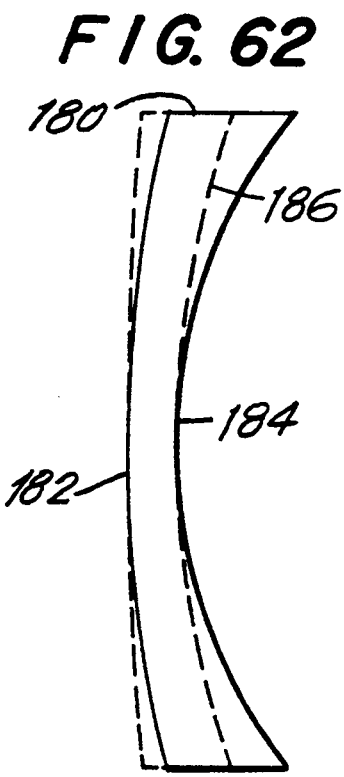
FIG. 62 is a sectional view of a concave lens constructed in accordance with an eighth embodiment of this invention.

Reference is now made to FIG. 62 in which a sectional view of a minus power lens, generally indicated as 180, constructed in accordance with an eighth embodiment of the invention is shown. Lens 180 includes a front refractive surface 182 and a rear refractive surface 184. A region of front refractive surface 182 extending from the center thereof to the periphery thereof is formed as a non-spherical surface having a minus refracting power. Rear refracting surface 184 is also formed as a non-spherical surface which is adapted to compensate for deterioration in the optical performance of lens 180. In the upper section of lens 180, astigmatism is compensated for with respect to objects viewed at a far distance such as 1,000 m. The lower section of lens 180 compensates for astigmatism with respect to a short distance such as 0.3 m. The astigmatism compensation with respect to the long distance is effected to a higher degree than the astigmatism compensation with respect to the short distance, so that the rise in the rear refractive surface is larger in the upper section of lens 180, resulting in an edge thickness in the outer peripheral section of lens 180 being smaller than in the lower section of lens 180.

Figure 63:
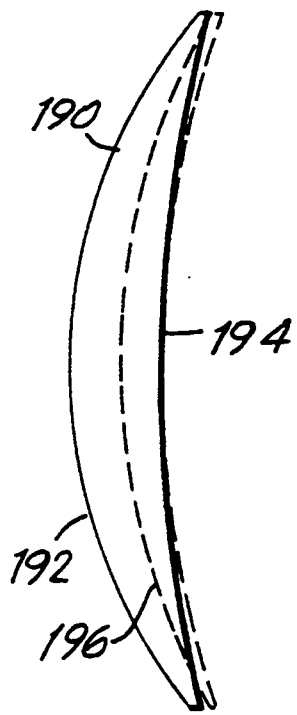
FIG. 63 is a sectional view of a convex lens constructed in accordance with a ninth embodiment of this invention.

Reference is now made to FIG. 63 in which a plus lens, generally indicated as 190, constructed in accordance with a ninth embodiment of the invention is provided. Lens 190 includes a front refractive surface 192 and a rear refractive index surface 194. A minus refracting power is provided in a region extending from the center of rear refracting surface 194 to the outer periphery of rear refracting surface 194. Astigmatism is compensated for with respect to a long distance such as 1,000 m by that section of front refracting surface 196 which is in the upper section of the lens. In the lower section of the lens, astigmatism is compensated for with respect to short distances such as 0.3 m. As in lens 180, the astigmatism compensation with respect to a long distance is effected to a higher degree than that with respect to a short distance. Accordingly, the upper section of the lens is made flatter than the lower section of the lens.

Each of the lenses described above is particularly effective when applied to a lens which is formed of a material having a high refractive index of 1.55 or more.

Figure 64:
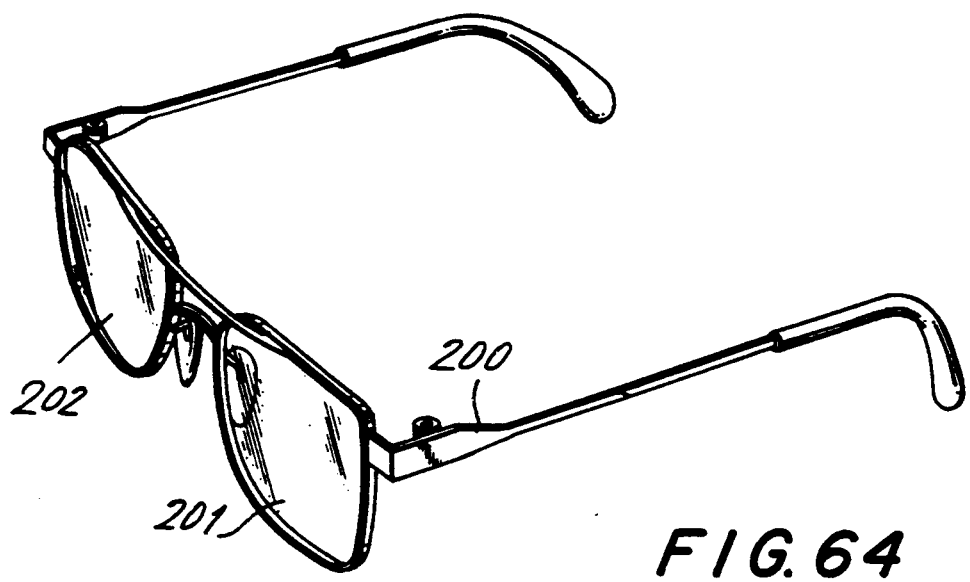
FIG. 64 is a perspective view of a pair of eyeglasses including an eyeglass lens constructed in accordance with the invention.

Reference is now made to FIG. 64 in which the use of the eyeglass lens is illustrated. A frame 200 holds a first eyeglass lens 201 and a second eyeglass lens 202 in place for use in a pair of eyeglasses. Lenses 201 and 202 are constructed in accordance with any of the embodiments discussed above.

By providing an eyeglass lens having different non-spherical surfaces in the upper and lower sections thereof, astigmatism is compensated for with respect to both long and short distances, making it possible to improve the optical properties of a conventional non-spherical lens without impairing the benefits of making a thin and light eyeglass lens. Research has shown that the degree of non-sphericalness for compensating for light distortions must be higher with respect to an object at a long distance than with respect to a nearby object. That is, the variation in curvature from the lens center to the outer periphery of the lens is larger when compensating for aberrations with respect to an object at a long distance than when compensating for aberrations with respect to a nearby object. Further, it is to be noted that a lens having a refracting surface with a high degree of non-sphericalness generally exhibits a large variation in degree from the lens center to the outer periphery. Accordingly, by providing a lens as described above in which a non-spherical surface portion exhibiting a relatively large variation in degree is arranged in the upper section of the lens and a non-spherical portion exhibiting a relatively small variation in degree is arranged in a lower section of the lens, the distortions with respect to an object at a relatively long distance are compensated for by the upper section of the lens, and the distortions with respect to an object at a relatively short distance are compensated for by the lower section of the lens. Therefore, such a construction results in an eyeglass lens having only slight distortions over the entire visual field. Furthermore, when a minus refracting power is imparted to a side of the lens which has the smaller refracting power, the side of the lens having a relatively large refractive power is made non-spherical so that the lens thickness in the peripheral region is reduced and the central thickness is diminished so as to reduce its forward protrusion in a plus prescription lens.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An eyeglass lens for correcting an astigmatism, said lens having an optical center and periphery comprising an outer facing front refracting surface having a minus refracting power and an outer facing rear refracting surface, said rear refracting surface having a radius of curvature which varies from the optical center of the lens to the outer periphery of the lens.

2. The eyeglass lens of claim 1, wherein said outer face front refracting surface is aspherical.

3. An eyeglass lens comprising a front aspherical refracting surface having a first refracting power, said refracting power being a minus refracting power in a region extending from the optical center of said lens to the periphery of the lens, a rear aspherical refracting surface having a second refracting power substantially larger than said first refracting power extending from the optical center of the lens to the periphery of the lens and a compensating surface adapted to compensate for the deterioration in the optical properties of the lens due to the first refracting power being a minus refracting power.

4. The eyeglass lens of claim 3, wherein said lens is a bifocal lens.

5. The eyeglass lens of claim 3, wherein said eyeglass lens has a refractive index which is not less than 1.55.

6. A minus powered eyeglass lens for correcting an astigmatism comprising a front aspherical refracting surface having a minus refracting power extending from the optical center of the lens to the periphery of the lens and a rear aspherical refracting surface, said rear refracting lens being a compensating surface having a radius of curvature that varies from the optical center of the lens to the outer periphery of the lens.

7. Eyeglasses comprising at least one lens having a front aspherical refracting surface having a first refracting power, said refracting power being a minus refractive power and a region extending from the optical center of said lens to the periphery of the lens, a second refracting surface having a rear aspherical refracting power substantially larger than said refracting power extending from the optical center to the periphery of the lens and a compensating surface adapted to compensate for the deterioration and the optical properties of the lens due to the front refracting power being a minus refracting power; and an eyeglass frame, said lens being disposed within said eyeglass frame.

* * * * *